(12) United States Patent
Tse (10) Patent No.: US 8,962,761 B2
(45) Date of Patent: Feb. 24, 2015

(54) LONG CHAIN BRANCHED EPDM COMPOSITIONS AND PROCESSES FOR PRODUCTION THEREOF

(71) Applicant: ExxonMobil Chemical Patents Inc., Baytown, TX (US)

(72) Inventor: Mun F. Tse, Seabrook, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

(21) Appl. No.: 13/954,333

(22) Filed: Jul. 30, 2013

(65) Prior Publication Data

US 2014/0051809 A1 Feb. 20, 2014

Related U.S. Application Data

(60) Provisional application No. 61/683,892, filed on Aug. 16, 2012, provisional application No. 61/683,900, filed on Aug. 16, 2012.

(51) Int. Cl.

| C08F 8/00 | (2006.01) |
|---|---|
| C08F 255/00 | (2006.01) |
| C08L 23/06 | (2006.01) |
| C08L 23/14 | (2006.01) |
| C08F 279/02 | (2006.01) |
| C08L 9/00 | (2006.01) |

(52) U.S. Cl.
CPC ............ *C08F 255/00* (2013.01); *C08L 23/06* (2013.01); *C08L 23/14* (2013.01); *C08F 279/02* (2013.01); *C08L 9/00* (2013.01)
USPC .......................................... 525/193; 525/194

(58) Field of Classification Search
CPC ........ C08C 19/28; C08C 19/22; C08C 19/24; C08C 19/25
USPC ................................................. 525/193, 194
See application file for complete search history.

(56) References Cited

U.S. PATENT DOCUMENTS

| 4,316,971 A | 2/1982 | Rim et al. |
|---|---|---|
| 4,735,988 A | 4/1988 | Takada et al. |
| 5,656,693 A | 8/1997 | Ellul et al. |
| 6,403,716 B1 | 6/2002 | Nishihara |
| 6,545,088 B1 | 4/2003 | Kolthammer et al. |
| 7,553,802 B2 | 6/2009 | Tanaglia |
| 2003/0073783 A1 | 4/2003 | Kim et al. |
| 2007/0254971 A1* | 11/2007 | De Vogel et al. ................ 521/59 |
| 2011/0275764 A1 | 11/2011 | Ellul et al. |

FOREIGN PATENT DOCUMENTS

| WO | 94/07930 | 4/1994 |
|---|---|---|
| WO | 94/26816 | 11/1994 |
| WO | 97/00291 | 1/1997 |
| WO | 01/85839 | 11/2001 |

OTHER PUBLICATIONS

Mark, J.E., et al. "Rubberlike Elasticity. A Molecular Primer", Wiley-Interscience, New York (1988), Chapter 13.
Ravishandar, et al. "Advanced EPDM for Wire and Cable Applications", Rubber World, vol. 219, No. 3, Dec. 1998, pp. 23-30, 57.
Sun, T., et al. "Effect of Short Chain Branching on the Coil Dimensions of Polyolefins in Dilute Solution", Macromolecules, 2001, vol. 34, No. 19, pp. 6812-6820.
VanGurp, M., et al. "Time-Temperature Superposition for Polymeric Blends", Rheol. Bull., 1998, 67, pp. 5-8.
Mark, et al., "Multimodal Networks", Rubberlike Elasticity, 2003, Ch. 13, pp. 131-148.

* cited by examiner

*Primary Examiner* — Nathan M Nutter
(74) *Attorney, Agent, or Firm* — Catherine L. Bell (57) ABSTRACT

Highly branched compositions including: (i) from about 96 wt % to about 99.9 wt % metallocene catalyzed ethylene propylene diene derived units; and (ii) from about 0.1 wt % to about 4 wt % multifunctional monomer derived units, wherein the highly branched composition has: (a) a Mooney viscosity ML (1+4) at 125° C. of about 30 to 100 MU, (b) a Mooney relaxation area MLRA of about 100 to about 1000, (c) a branching index, g'(vis) of less than about 0.9, (d) a phase angle, δ, of less than about 55 degrees at a complex modulus of 10 kPa, measured at 190° C., and (e) a degree of shear thinning greater than about 0.95, measured at 190° C., are disclosed herein. Homogeneous blends including this composition are also described. Processes to make the highly branched composition and the homogeneous blend are also described herein.

13 Claims, 2 Drawing Sheets

LONG CHAIN BRANCHED EPDM COMPOSITIONS AND PROCESSES FOR PRODUCTION THEREOF

PRIORITY CLAIM

The present application claims priority to U.S. Application Ser. No. 61/683,900, filed on Aug. 16, 2012, and U.S. Application Ser. No. 61/683,892, filed on Aug. 16, 2012, both of which are herein incorporated by reference.

FIELD OF THE INVENTION

Embodiments provided herein generally relate to modified ethylene propylene diene rubber (EPDM) and processes for producing the same. More particularly, embodiments provided herein relate to long chain branched metallocene-catalyzed EPDM and processes for making them.

BACKGROUND OF THE INVENTION

The ethylene propylene diene rubber (EPDM) market is rapidly growing due in part to the wide range of uses available for this general purpose elastomer. Indeed, the worldwide capacity was estimated in 2011 to exceed 1,093 ktons per annum. EPDM rubbers typically have remarkable properties including excellent resistance to ozone, heat, and weather, and the ability to be highly extended by oil. Accordingly, EPDM rubbers are used in various applications such as automotive, electrical, construction, roofing, and high-performance hoses and belts.

EPDM rubbers are traditionally commercially produced using conventional Ziegler-Natta catalysts based on transition metals, such as V and Ti (znEPDM) znEPDM typically has long chain branching that may be due to cationic coupling of pendant double bonds or Ziegler polymerization through both double bonds of a diene. Long chain branching does not typically affect polymerization rate, but has a profound effect on molecular weight, molecular weight distribution (MWD), ethylene compositional distribution (CD), and processability. Accordingly, znEPDM tends to have broad MWD and CD. According to P. S. Ravishankar and N. R. Dharmarajan (Rubber World, December, 1998) another advantage of long chain branching is that, before vulcanization, the extruded EPDM compounds (oil-free formulations) used in electrical wire and cable applications show smooth surfaces rather than extrudates with coarse surfaces. However, a broader CD in znEPDM (that is, a broader interchain distribution of ethylene derived units) may result in undesirably higher crystallinity.

Currently, metallocene catalyst systems based on Zr, Ti, or Hf are attractive for EPDM production (mEPDM), due in part to the lower cost of production and significant emission reduction. These metallocene catalyst systems tend to have oligomeric methyl aluminoxane (methyl alumoxane, MAO) or compounds such as tri-n-butylammonium tetra(perfluorophenyl)borate or N,N-dimethylaniliniumtetra(perfluorophenyl)borate as a cocatalyst. The resulting ionic complexes are highly stereospecific, producing mEPDM rubbers with very little long chain branching, and a narrow MWD and CD. Although the narrow CD is desirable, the lack of long chain branching and the narrow MWD adversely affects the performance of mEPDMs, especially in processability, that is, mEPDMs generally need further improvement, particularly in shear thinning and green strength.

There is therefore a need for mEPDM rubbers with improved processability, while retaining the advantages of narrow CD. There is also a need for processes to produce such mEPDM rubbers, and for improved articles made using such mEPDM rubbers.

SUMMARY OF THE INVENTION

This invention relates to highly branched compositions comprising:
(i) from about 96 wt % to about 99.9 wt % metallocene catalyzed ethylene propylene diene derived units, based on the total weight of the composition;
(ii) from about 0.1 wt % to about 4 wt % multifunctional monomer derived units, based on the total weight of the composition;
wherein the highly branched composition has:
   (a) a Mooney viscosity ML (1+4) at 125° C. of about 30 to 100 MU;
   (b) a Mooney relaxation area MLRA of about 100 to about 1000;
   (c) a branching index, g'(vis) of less than about 0.9;
   (d) a phase angle, $\delta$, of less than about 55 degrees at a complex modulus of 10 kPa, measured at 190° C.; and
   (e) a degree of shear thinning greater than about 0.95, measured at 190° C.

This invention yet further relates to processes for producing a highly branched composition comprising:
(i) contacting:
   (a) from about 96 wt % to about 99.9 wt % of at least one metallocene catalyzed ethylene propylene diene rubber, based on the total weight of the rubber and multifunctional monomers;
   (b) from about 0.1 wt % to about 4 wt % of at least one multifunctional monomer, based on the total weight of the rubber and multifunctional monomers;
   (c) at least one free radical generator; and
(ii) obtaining a highly branched composition.

This invention also relates to homogeneous blends, comprising:
(1) at least one olefin based polymer having a g'(vis) of greater than about 0.90; and
(2) a highly branched composition, comprising:
   (i) from about 96 wt % to about 99.9 wt % metallocene catalyzed ethylene propylene diene derived units, based on the total weight of the composition;
   (ii) from about 0.1 wt % to about 4 wt % multifunctional monomer derived units, based on the total weight of the composition;
wherein the highly branched composition has:
   (a) a Mooney viscosity ML (1+4) at 125° C. of about 30 to 100 MU;
   (b) a Mooney relaxation area MLRA of about 100 to about 1000;
   (c) a branching index, g'(vis), of less than about 0.9;
   (d) a phase angle, $\delta$, of less than about 55 degrees at a complex modulus of 10 kPa, measured at 190° C.; and
   (e) a degree of shear thinning greater than about 0.95, measured at 190° C.

This invention even further relates to processes for producing a homogeneous blend comprising:
(a) mixing:
   (1) at least one olefin based polymer having a g'(vis) of greater than about 0.90; and
   (2) a highly branched composition, comprising:
      (i) from about 96 wt % to about 99.9 wt % metallocene catalyzed ethylene propylene diene derived units;
      (ii) from about 0.1 wt % to about 4 wt % multifunctional monomer derived units, wherein the highly branched composition has:
  a) a Mooney viscosity ML (1+4) at 125° C. of about 30 to 100 MU;
  b) a Mooney relaxation area MLRA of about 100 to about 1000;
  c) a branching index, g'(vis), of less than about 0.9;
  d) a phase angle, δ, of less than about 55 degrees at a complex modulus of 10 kPa, measured at 190° C.;
  e) a degree of shear thinning greater than about 0.95, measured at 190° C.; and
(b) obtaining a homogeneous blend;
wherein the homogeneous blend preferably has one or more of the following properties:
  (1) a Young's modulus, $E_o$, of at least 45% or more of the Young's modulus of the olefin based polymer;
  (2) a 100% modulus, E100, of at least 77% or more of the 100% modulus of the olefin based polymer;
  (3) a strain at which the stress is maximized, $e_m$, equal to or higher than the strain at which the stress is maximized of the olefin based polymer;
  (4) a maximum stress, $\sigma_m$, of at least 74% or more of the maximum stress of the olefin based polymer;
  (5) a strain at break, $e_b$, of 95% or more of the strain at break of the olefin based polymer;
  (6) a stress at break, $\sigma_b$, of at least 50% or more of the stress at break of the olefin based polymer; and
  (7) a tensile toughness, U, of at least 72% or more of the tensile toughness of the olefin based polymer.

This invention also relates to a reaction product of:
(i) from about 96 wt % to about 99.9 wt % metallocene catalyzed ethylene propylene diene, based on the total weight of the metallocene catalyzed ethylene propylene diene rubber and multifunctional monomers;
(ii) from 0 wt % to about 4 wt % multifunctional monomer, based on the total weight of the metallocene catalyzed ethylene propylene diene rubber and multifunctional monomers; and
(iii) from about 0.1 wt % to about 4 wt % free radical generator, based on the total weight of the metallocene catalyzed ethylene propylene diene rubber and multifunctional monomers;
wherein the reaction product has the following properties:
  (a) a Mooney viscosity ML (1+4) at 125° C. of about 30 to 100 MU;
  (b) a Mooney relaxation area MLRA of about 100 to about 1000;
  (c) a branching index, g'(vis) of less than about 0.9;
  (d) a phase angle, δ, of less than about 55 degrees at a complex modulus of 10 kPa, measured at 190° C.; and
  (e) a degree of shear thinning greater than about 0.95, measured at 190° C.

DETAILED DESCRIPTION

This invention relates to highly branched metallocene catalyzed ethylene propylene diene (mEPDM) compositions.

These highly branched mEPDM compositions are produced via post-reactor modification and therefore retain the desired polymer chain distribution of a traditional mEPDM, while advantageously having increased long chain branching. These inventive compositions are produced by the reactive mixing of a linear ethylene propylene diene rubber (EPDM) in the presence of a free radical generator and a multifunctional monomer. In particular embodiments of this invention, the inventive compositions are the reaction product of a mEPDM rubber, a free radical generator, and optionally, a multifunctional monomer. The resulting highly branched mEPDM composition may be used alone as a new polymer or may be blended with other olefin-based polymers or copolymers as a modifier. Advantageously, when used alone as a new polymer, this highly branched mEPDM composition exhibits improved green strength, melt elasticity or melt strength, and shear thinning when compared to the precursor mEPDM.

Processes to produce the highly branched compositions and the homogeneous blends comprising these compositions are also disclosed below.

DEFINITIONS

Definitions applicable to the presently described invention are as described below.

An "elastomer" includes all natural and synthetic rubbers, including those consistent with the ASTM D1566-11 definition: "a material that is capable of recovering from large deformations quickly and forcibly, and can be, or already is, modified to a state in which it is essentially insoluble (but can swell) in boiling solvent, such as benzene, methyl ethyl ketone, or ethanol-toluene azeotrope." Examples of preferred elastomers include, but are not limited to, ethylene propylene rubber, ethylene propylene diene monomer rubber, styrenic block copolymer rubbers (including SI, SIS, SB, SBS, SiBS, SEPS, SEBS, and the like, where S=styrene, I=isoprene, iB=isobutylene, EP=ethylene propylene, EB=ethylene butene-1, and B=butadiene), butyl rubber, halobutyl rubber, copolymers of isobutylene and para-alkylstyrene, halogenated copolymers of isobutylene and para-alkylstyrene, natural rubber (NR), polyisoprene, copolymers of butadiene with acrylonitrile, copolymers of butadiene with styrene (SBR), polychloroprene, alkyl acrylate rubber, chlorinated isoprene rubber, acrylonitrile chlorinated isoprene rubber, and polybutadiene rubber (both cis and trans). Elastomer is a term that may be used interchangeably with the term rubber. Elastomeric composition refers to any composition comprising at least one elastomer as defined above.

As used herein, Mn is number average molecular weight as determined by High Temperature Size Exclusion Chromatography (SEC), Mw is weight average molecular weight as determined by SEC, and Mz is z average molecular weight as also determined by SEC. Molecular weight distribution (MWD) is defined to be Mw divided by Mn.

As used herein, "wt %" means weight percent, "mol %" means mole percent, "vol %" means volume percent, and all molecular weights, e.g., Mw, Mn, Mz, are in units of g/mol, unless otherwise noted. Furthermore, all molecular weights are Mw unless otherwise noted.

For the purposes of this invention and the claims thereto, the new numbering scheme for the Periodic Table Groups is used as set out in CHEMICAL AND ENGINEERING NEWS, 63(5), pg. 27 (1985). Therefore, a "Group 4 metal" is an element from Group 4 of the Periodic Table.

A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. For purposes herein, a "polymer chain" or "polymeric chain" comprises a concatenation of carbon atoms bonded to each other in a linear or a branched chain, which is referred to herein as the backbone of the polymer (e.g., polyethylene).

As used herein, when a polymer is referred to as comprising a monomer, the monomer is present in the polymer in the polymerized form of the monomer or in the derivative form of the monomer. The term "derived units" as used herein, refers to the polymerized form of the monomer from which the polymer was derived. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. Furthermore, polyethylene comprises ethylene derived units, a terpolymer of propylene/ethylene/butene comprises propylene derived units, ethylene derived units and butene derived units, and so on.

Highly Branched Compositions

This invention relates to a highly branched composition, comprising:
(i) from about 96 wt % to about 99.9 wt % (preferably from about 96.5 wt % to about 99.5 wt %; preferably from about 97 wt % to about 99 wt %; preferably from about 97.5 wt % to about 98.5 wt %) metallocene catalyzed ethylene propylene diene derived units, based on the total weight of the composition; and
(ii) from about 0.1 wt % to about 4 wt % (preferably from about 0.5 wt % to about 3.5 wt %, preferably from about 0.5 wt % to about 3 wt %, preferably from about 1 wt % to about 2.5 wt %, preferably from about 1.5 wt % to about 2 wt %) multifunctional monomer derived units, based on the total weight of the composition;
wherein the highly branched composition has:
  (a) a Mooney viscosity ML (1+4) at 125° C. of about 30 to about 100 MU (preferably about 40 to about 100, preferably about 50 to about 100, preferably about 60 to about 100);
  (b) a Mooney relaxation area MLRA of about 100 to about 1000 (preferably about 200 to about 1000, preferably about 300 to about 1000, preferably about 450 to about 950);
  (c) a branching index, g'(vis) of less than about 0.9 (preferably less than about 0.85, preferably less than about 0.80);
  (d) a phase angle, δ, of less than about 55 degrees (preferably less than about 50 degrees, preferably less than about 45 degrees) at a complex modulus of 10 kPa, measured at 190° C.; and
  (e) a degree of shear thinning greater than about 0.95 (preferably greater than about 0.96, preferably greater than about 0.97), measured at 190° C.

This invention also relates to a reaction product of:
(i) from about 96 wt % to about 99.9 wt % (preferably from about 96.5 wt % to about 99.5 wt %, preferably from about 97 wt % to about 99 wt %, preferably from about 97.5 wt % to about 98.5 wt %) mEPDM rubber, based on the total weight of mEPDM rubber and multifunctional monomers;
(ii) from 0 wt % to about 4 wt % (preferably from about 0.5 wt % to about 3.5 wt %, preferably about 0.5 wt % to about 3 wt %, preferably about 1 wt % to about 2.5 wt %, preferably about 1.5 wt % to about 2 wt %) multifunctional monomer derived units, based on the total weight of mEPDM rubber and multifunctional monomers; and
(iii) from about 0.1 wt % to about 4 wt % (preferably from about 0.5 wt % to about 3.5 wt %, preferably from about 0.5 wt % to about 3 wt %, preferably from about 1 wt % to about 2.5 wt %, preferably from about 1.5 wt % to about 2 wt %) free radical generator, based on the total weight of mEPDM rubber and multifunctional monomers;
wherein the reaction product has the following properties:
  (a) a Mooney viscosity ML (1+4) at 125° C. of about 30 to about 100 MU (preferably about 40 to about 100, preferably about 50 to about 100, preferably about 60 to about 100);
  (b) a Mooney relaxation area MLRA of about 100 to about 1000 (preferably about 200 to about 1000, preferably about 300 to about 1000, preferably about 450 to about 950);
  (c) a branching index, g'(vis) of less than about 0.9 (preferably less than about 0.85, preferably less than about 0.80);
  (d) a phase angle, δ, of less than about 55 degrees (preferably less than about 50 degrees, preferably less than about 45 degrees) at a complex modulus of 10 kPa, measured at 190° C.; and
  (e) a degree of shear thinning greater than about 0.95 (preferably greater than about 0.96, preferably greater than about 0.97), measured at 190° C.;
  (f) optionally, a tensile strength greater than about 15 MPa (preferably greater than about 20 MPa, preferably greater than about 30 MPa), as measured at 23° C.;
  (g) optionally, an elongation at break greater than 75% (preferably greater than 100%, preferably greater than 110%, preferably greater than 115%), as measured at 23° C.;
  (h) optionally, a tensile modulus at 100% elongation greater than 0.10 MPa (preferably greater than 0.2 MPa, preferably greater than 0.3 MPa), as measured at 23° C.); and
  (i) optionally, an increase in relaxation time, defined as (MLRA)/[ML (1+4)], of at least 15% (preferably at least 30%, preferably at least 50%) relative to the mEPDM of step (i).

"Highly branched" compositions herein have long chain branching due to the incorporation of a free radical generator. In preferred embodiments of this invention, the long chain branching is additionally due to the incorporation of the multifunctional monomers. This branching is characterized by a branching index, g'(vis), of less than about 0.95 (preferably less than about 0.90, preferably less than about 0.85, preferably less than about 0.80). g'(vis) is determined from the SEC method outlined in the Properties of Highly Branched Compositions section, below.

The highly branched composition comprises from about 96 wt % to about 99.9 wt % (preferably from about 96.5 wt % to about 99.5 wt %, preferably from about 97 wt % to about 99 wt %, preferably from about 97.5 wt % to about 98.5 wt %) metallocene catalyzed ethylene propylene diene derived units, based on the total weight of the composition. In preferred embodiments of this invention, the highly branched composition comprises from about 98 wt % to about 99.9 wt % (preferably from about 98.5 wt % to about 99.9 wt %, preferably from about 98.6 wt % to about 99.9 wt %), based on the total weight of the composition. "Metallocene catalyzed ethylene propylene diene derived units" means that mEPDM rubber is used as a precursor polymer to produce this highly branched composition. mEPDMs are discussed in more detail below.

The highly branched composition comprises from about 0.1 wt % to about 4 wt % (preferably from about 0.5 wt % to about 3.5 wt %, preferably from about 0.5 wt % to about 3 wt %, preferably from about 1 wt % to about 2.5 wt %, preferably from about 1.5 wt % to about 2 wt %) multifunctional monomer derived units, based on the total weight of the composition. In preferred embodiments of this invention, the highly branched composition comprises from 0 wt % to about 1 wt % (preferably from 0 wt % to about 0.5 wt %, preferably from 0 wt % to about 0.2 wt %, preferably from 0 wt % to about 0.15 wt %) multifunctional monomer derived units, based on the total weight of the composition. In some embodiments, the "multifunctional monomer derived units" means that the multifunctional monomer is present in its polymerized form in the highly branched composition. The multifunctional monomer is discussed in more detail below.

In preferred embodiments of this invention, the highly branched composition is a reaction product, wherein one of the reactants is from about 0.1 wt % to about 4 wt % (preferably from about 0.5 wt % to about 3.5 wt %, preferably from about 0.5 wt % to about 3 wt %, preferably from about 1 wt % to about 2.5 wt %, preferably from about 1.5 wt % to about 2 wt %) free radical generator, based on the total weight of mEPDM rubber and multifunctional monomer. The free radical generator is discussed in more detail below.

In preferred embodiments of this invention, the highly branched composition is a reaction product, wherein one of the reactants is from 0 wt % to about 4 wt % (preferably from about 0.5 wt % to about 3.5 wt %, preferably from about 0.5 wt % to about 3 wt %, preferably from about 1 wt % to about 2.5 wt %, preferably from about 1.5 wt % to about 2 wt %) multifunctional monomer derived units, based on the total weight of mEPDM rubber and multifunctional monomers.

In preferred embodiments of this invention, the highly branched composition is a reaction product, wherein one of the reactants is from about 96 wt % to about 99.9 wt % (preferably from about 96.5 wt % to about 99.5 wt %, preferably from about 97 wt % to about 99 wt %, preferably from about 97.5 wt % to about 98.5 wt %, preferably from about 98 wt % to about 99.9 wt %) mEPDM rubber, based on the total weight of mEPDM rubber and multifunctional monomers.

Properties of Highly Branched Compositions

The compositions of the present invention have a new and useful combination of properties that allow them to be more useful than traditional mEPDM rubbers.

Mooney Viscosity and Mooney Relaxation Area

Processability is arguably one of the most important and critical properties of rubber and rubber compounds. Mooney viscosity is a property used to monitor the quality of both natural and synthetic rubbers. It measures the resistance of rubber to flow at a relatively low shear rate. The highly branched compositions have a Mooney viscosity ML (1+4) at 125° C. of about 30 to about 100 MU (preferably about 40 to about 100, preferably about 50 to about 100, preferably about 60 to about 100), where MU is Mooney Units.

While the Mooney viscosity indicates the plasticity of the rubber, the Mooney relaxation area (MLRA) provides a certain indication of the effects of molecular weight distribution and elasticity of the rubber. The highly branched compositions also have a MLRA of about 100 to about 1000 (preferably about 200 to about 1000, preferably about 300 to about 1000, preferably about 450 to about 950).

Another indication of melt elasticity is the ratio of MLRA/ ML (1+4). This ratio has the dimension of time and can be considered as a "relaxation time." A higher number signifies a higher degree of melt elasticity. Long chain branching will slow down the relaxation of the polymer chain, hence increasing the value of MLRA/ML (1+4). The highly branched compositions of this invention preferably have an (MLRA)/[ML (1+4)], of at least 15%, preferably at least 30%, preferably at least 50%, higher than the precursor mEPDM rubber.

Mooney viscosity and Mooney relaxation area are measured using a Mooney viscometer, operated at an average shear rate of about $2\ s^{-1}$, according to the following modified ASTM D1646.

A square of sample is placed on either side of the rotor. The cavity is filled by pneumatically lowering the upper platen. The upper and lower platens are electrically heated and controlled at 125° C. The torque to turn the rotor at 2 rpm is measured by a torque transducer. The sample is preheated for 1 minute after the platens was closed. The motor is then started and the torque is recorded for a period of 4 minutes. Results are reported as ML (1+4) at 125° C., where M is Mooney viscosity number, L denotes the large rotor, 1 is the sample preheat time in minutes, 4 is the sample run time in minutes after the motor starts, and 125° C. is the test temperature.

The MLRA data is obtained from the Mooney viscosity measurement when the rubber relaxed after the rotor is stopped. The MLRA is the integrated area under the Mooney torque-relaxation time curve from 1 to 100 seconds. The MLRA can be regarded as a stored energy term which suggests that, after the removal of an applied strain, the longer or branched polymer chains can store more energy and require longer time to relax. Therefore, the MLRA value of a bimodal rubber (the presence of a discrete polymeric fraction with very high molecular weight and distinct composition) or a long chain branched rubber are larger than a broad or a narrow molecular weight rubber when compared at the same Mooney viscosity values.

Mooney viscosity values greater than about 100 cannot generally be measured using ML (1+4) at 125° C. In this event, a higher temperature is used (e.g., 150° C.), with eventual longer shearing time (i.e., 1+8 at 125° C. or 150° C.), but more preferably, the Mooney measurement is carried out using a non-standard small rotor as described below. The non-standard rotor design is employed with a change in Mooney scale that allows the same instrumentation on the Mooney machine to be used with higher Mooney rubbers. This rotor is termed MST, Mooney Small Thin, in contrast with ML. According to EP 1 519 967 B1, one MST point is approximately 5ML points when MST is measured at (5+4) at 200° C. and ML is measured at (1+4) at 125° C. ASTM D1646-99 prescribes the dimensions of the rotor to be used within the cavity of the Mooney machine. This prescription allows a large and a small rotor differing only in diameter. These are referred to as ML (Mooney Large) and MS (Mooney Small).

Branching Index, g'(vis)

The branching index gives an indication of how branched the composition is, with a lower g'(vis) generally indicating more branched structures, while a higher g'(vis) indicates less branched and more linear structures. The branching index spans a range of from 1.0 (linear) to 0.1 (hyperbranched). For the purposes of this invention, a g'(vis) of from 0.95 to 1 indicates a linear structure. The highly branched compositions have a branching index, g'(vis) of less than 0.95 (preferably less than about 0.90; preferably less than about 0.85; preferably less than 0.80).

Weight-average molecular weight, Mw, molecular weight distribution (MWD), Mw/Mn where Mn is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not described below, including how the detectors are calibrated, are described in: T. Sun, P. Brant, R. R. Chance, and W. W. Graessley, Macromolecules, Volume 34, Number 19, 6812-6820, (2001).

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 µm glass pre-filter and subsequently through a 0.1 µm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranged from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in $g/cm^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2=0.0015$ and dn/dc=0.104 for ethylene polymers, whereas $A_2=0.0006$ and dn/dc=0.104 for propylene polymers. For EPDM, the values of $A_2$ and dn/dc are determined based on the ethylene/propylene composition of the EPDM using a standard calibration procedure, such that dn/dc=0.104−0.0016DM; and $A_2=0.0015-10^{-5}$ EP; where EP is the weight percent of propylene in the EP portion of the EPDM terpolymer and DM is the weight percent of diene (such as ENB) in the EPDM terpolymer.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i.$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules $$x_i = N_i / \Sigma N_i.$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{k M_v^\alpha}$$

where k=0.000579 and α=0.695 for ethylene polymers, k=0.0002288 and α=0.705 for propylene polymers, and k=0.00018 and α=0.7 for butene polymers. For EPDM, the values of k and α are determined based on the ethylene/propylene composition of the EPDM using a standard calibration procedure such that: k=(1−0.012254DM) (1−0.0048601EP−6.8989×10$^{-6}$EP$^2$)×5.9×10$^{-4}$ (200000)$^{-Trunc(0.1EP)/1000}$ and α=0.695+Trunc(0.1EP)/1000, where EP is the weight percent of propylene in the EP portion of the EPDM rubber, DM is the weight percent diene in the EDPM rubber, and Trunc indicates that only the integer portion is kept in the calculation. For example, Trunc(5.3)=5.

$M_v$ is the viscosity-average molecular weight based on molecular weights determined by the LS analysis:

$$M_v = (\Sigma c_i M_i^\alpha / \Sigma c_i)^{1/\alpha}.$$

Percent gel of the analyzed polymer is determined from the inject mass and the mass calculated from the DRI response, as follows: % gel=[(inject mass)−(mass calculated from the DRI response)]/(inject mass). The inject mass is the original mass of the polymer used to prepare the TCB polymer solution. Then the TCB polymer solution will be manually filtered, and this filtered solution will be injected into the GPC. The solution will pass through an in-line filter inside the GPC and all the columns. The mass calculated from the DRI response represents the final mass of the polymer reaching the detector.

Phase Angle and Shear Thinning

The highly branched compositions yet further have a phase angle, δ, of less than about 55 degrees (preferably less than about 50 degrees; preferably less than about 45 degrees) at a complex modulus of 10 kPa, measured at 190° C.

The highly branched compositions also have a degree of shear thinning greater than about 0.95 (preferably greater than 0.96; preferably greater than 0.97), measured at 190° C.

Relaxation temperature, phase angle and degree of shear thinning are determined by small-strain dynamic mechanical measurements. Polymers and the BRABENDER™ mixes are compression-molded into plaques with a thickness of about 0.7 mm and a thickness of about 2 mm. A press at 180° C., a molding time of 15 min, and a press force of 25 tons (22.6 Mg) are used.

In the Dynamic Mechanical Thermal Analysis (DMTA) experiment, a sample with dimensions of ~23 mm×6.42 mm is die-cut from the compression-molded plaque with a thickness of about 0.7 mm. The sample is conditioned under ambient conditions for 24 hours before the measurement. The instrument used is the DMTA V (available from TA Instruments, New Castle, Del.) in tension mode (0.05% strain, 1 Hz frequency, 2° C./min heating rate, and a temperature range of ca. −100° C. to 150° C.). For each EPDM, the relaxation temperatures are determined from the positions of the loss modulus and loss tangent maxima.

For the determinations of phase angle and degree of shear thinning of polymers and blends, a circular sample with a diameter of 25 mm is die-cut from the compression-molded plaque with a thickness of about 2 mm. The sample is mounted between the 25-mm diameter parallel plates in a Rheometric Scientific ARES Analyzer (Piscataway, N.J.). The test temperature is 190° C. and the strain applied is 10%. The complex modulus (G*), the phase angle (δ), and the complex viscosity (η*) are measured as the frequency is varied from 0.01 to 100 rad/s.

The phase or loss angle δ, is the inverse tangent of the ratio of G" (the shear loss modulus) to G' (the shear storage modulus). For a typical linear polymer, the phase angle at low frequencies (or long times) approaches 90° because the chains can relax in the melt, adsorbing energy and making G" much larger than G'. As frequencies increase, more of the chains relax too slowly to absorb energy during the shear oscillations, and G' grows relative to G". Eventually, G' and G" become equal and the phase angle reaches 45°. In contrast, a branched chain polymer relaxes very slowly even at temperatures well above the melting temperature of the polymer, because the branches need to retract before the chain backbone can relax along its tube in the melt. This polymer never reaches a state where all its chains can relax during a shear oscillation, and the phase angle never reaches 90° even at the lowest frequency, ω, of the experiments. The phase angle is also relatively independent of the frequency of the oscillations in the small-strain rheology experiment; another indication that the chains cannot relax on these timescales. These slowly relaxing chains lead to a higher zero shear viscosity. Long relaxation times lead to a higher polymer melt strength or elasticity.

Shear thinning is a unique rheological behavior of polymer melts during flow, where the resistance of a polymer melt to flow (steady-state viscosity) along a cylindrical tube decreases with increasing flow or shear rate. More specifically, the viscosity is generally constant at low shear rates. This is the Newtonian region and the viscosity there is called the zero shear viscosity. It is commonly more difficult to reach the Newtonian region in very polydisperse commercial polymers. At high shear rates, the viscosity drops inversely with a power of the shear rate. This is called the power law region. The crossover from the Newtonian behavior to the power law behavior is characterized by a critical shear rate, usually defined for convenience as the shear rate at which the viscosity has decreased to 20% below the zero shear viscosity. Shear thinning is believed to result from the stretching of the "entangled" state to an "oriented" state of the polymer chains when the applied shear rate is higher than this critical shear rate. Simply put, the polymer chains are increasingly stretched out in the shear direction as the shear rate or strain rate increases. This produces a decrease in the number of entanglements relative to the unstrained state, and, consequently, a decrease in melt viscosity. According to W. W. Graessley (Adv. Polym. Sci., 16, 1, 1974), the product of this critical shear rate and the characteristic relaxation time of the polymer is a constant. The longer relaxation time for a branched polymer makes the critical shear rate smaller than would be for a linear polymer with the same viscosity. Hence, the viscosity of a branched polymer is lower at high shear rates and the curves of viscosity plotted against shear rate for linear and branched polymers can cross. As a result, a polymer containing long chain branching exhibits a higher degree of shear thinning than a linear polymer in the molten state.

The real or in-phase component of the complex dynamic viscosity, η', at low frequencies approaches the steady flow zero shear viscosity. However, According to J. D. Ferry, Viscoelastic Properties of Polymers, 3$^{rd}$ Ed., Wiley, New York, 1980, η' and the steady flow viscosity should not be similar at large values of frequency and shear rate, respectively. This is due to the fact that steady flow at a high shear rate involves different molecular motions from oscillatory flow at low strains where escape from topological restrains is not required. However, it has been confirmed experimentally that the complex dynamic viscosity closely resembles the steady flow viscosity for homopolymers and polymer solutions (W. P. Cox and E. H. Merz, J. Polym. Sci., 28, 619, 1958; S. Onogi, T. Fuji, H. Kato, and S. Ogihara, J. Phys. Chem., 68(6), 1598, 1964; S. Onogi, H. Kato, S. Ueki, and T. Ibaraji, J. Polym. Sci., C15, 481, 1966; E. K. Harris, Jr., Ph.D. Thesis, University of Wisconsin, 1970). Therefore, the complex dynamic viscosity is employed throughout this invention to study the melt processability of the polymer systems and shear thinning is characterized by the decrease of complex dynamic viscosity with increasing frequency. Again, the complex viscosity can be measured by the small-strain rheological testing of the molten polymer (for example, at 190° C.) performed in a dynamic (oscillatory) rheometer in the shear mode as described in previous paragraphs. One way to quantify the degree of shear thinning is to use a ratio of the difference between the complex viscosity at a frequency of 0.1 rad/s:

$$[\eta^*(0.1\ rds) - \eta^*(100\ rds)]/\eta^*(0.1\ rds)$$

where $\eta^*(0.1\ rds)$ and $\eta^*(100\ rds)$ are the complex viscosities at frequencies of 0.1 and 100 rds, respectively, measured at 190° C. This ratio is used to measure the degree of shear thinning of the polymeric materials discussed in the various tables of this invention. The larger this ratio, the higher is the degree of shear thinning. Polymers exhibiting shear thinning behaviors are easily processed in high shear rate fabrication methods, such as injection molding.

The complex modulus ($G^*$) is equal to $[(G')^2+(G'')^2]^{1/2}$. The plot of phase angle versus the complex modulus is known as the van Gurp-Palmen plot (See M. van Gurp, J. Palmen, Rheol. Bull., 67, 5-8, 1998). The values of δ listed in the various tables of this invention are those at a $G^*$ of 10 kPa. The lower this δ, the higher is the melt elasticity or melt strength.

Tensile Properties

The highly branched mEPDM polymer compositions can have a tensile strength greater than 15 MPa (preferably greater than 20 MPa, preferably greater than 30 MPa), as measured by ASTM D638 at 23° C.

The highly branched mEPDM polymer compositions can have an elongation at break greater than 75% (preferably greater than 100%, preferably greater than 110%, preferably greater than 115%), as measured by ASTM D638 at 23° C.

The highly branched mEPDM polymer compositions can also have a tensile modulus at 100% elongation greater than 0.10 MPa (preferably greater than 0.2 MPa, preferably greater than 0.3 MPa), as measured by ASTM D638 at 23° C.

In some embodiments, the highly branched mEPDM polymer compositions can have a tensile modulus above 0.07 MPa (preferably a tensile strength above 0.10 MPa) and/or an elongation at break of at least 75% (preferably at least 90%, preferably at least 100%, and preferably at least 105%).

The highly branched mEPDM polymer compositions can also have a toughness of 0.30 MJ/m3 or more (preferably 0.35 MJ/m3 or more, preferably 0.40 MJ/m3 or more), as measured by ASTM D638 at 23° C. Toughness is defined as the ability of polymer to absorb applied energy up to break. The area under the stress-strain curve is used as a measure of the toughness at room temperature.

Process to Produce Highly Branched Compositions

This invention relates to processes for producing a highly branched composition comprising:
(i) contacting:
(a) from about 96 wt % to 99.9 wt % (preferably from about 96.5 wt % to about 99.5 wt %, preferably from about 97 wt % to about 99 wt %, preferably from about 97.5 wt % to about 98.5 wt %; or preferably from about 96.5 wt % to about 99.9 wt %, preferably from about 97 wt % to about 99.9 wt %, preferably from about 97.5 wt % to about 99.9 wt %; or preferably from about 98 wt % to about 99.9 wt %) of at least one metallocene catalyzed ethylene propylene diene rubber (preferably, the mEPDM is linear), based on the total weight of the rubber and multifunctional monomers;
(b) from about 0.1 wt % to about 4 wt % (preferably from about 0.5 wt % to about 3.5 wt %, preferably from about 0.5 wt % to about 3 wt %, preferably from about 1 wt % to about 2.5 wt %, preferably from about 1.5 wt % to about 2 wt %) of at least one multifunctional monomer, based on the total weight of the rubber and multifunctional monomers;
(c) at least one free radical generator (preferably from about 0.1 wt % to about 4 wt %, preferably from about 0.5 wt % to about 3.5 wt %, preferably about 0.5 wt % to about 3 wt %, preferably about 1 wt % to about 2.5 wt %, preferably about 1.5 wt % to about 2 wt %, based on the total weight of the rubber and multifunctional monomers); and
(ii) obtaining a highly branched composition;
wherein the total weight of metallocene catalyzed ethylene propylene diene rubber and multifunctional monomers is 100 wt %.

mEPDM Rubbers mEPDM rubbers are metallocene catalyzed EPDM rubbers. These mEPDM rubbers generally have different properties than EPDMs made using Ziegler-Natta catalysts (znEPDM). Generally, mEPDM rubbers have a narrower MWD and CD (ethylene compositional distribution) than znEPDM rubbers.

In this invention, mEPDM rubbers are used. The process comprises contacting from about 96 wt % to about 99.9 wt % (preferably from about 96.5 wt % to about 99.5 wt %, preferably from about 97 wt % to about 99 wt %, preferably from about 97.5 wt % to about 98.5 wt %; or preferably from about 96.5 wt % to about 99.9 wt %, preferably from about 97 wt % to about 99.9 wt %, preferably from about 97.5 wt % to about 99.9 wt %; or preferably from about 98 wt % to about 99.9 wt %) of at least one metallocene catalyzed ethylene propylene diene rubber (preferably, the mEPDM is linear), based on the total weight of the rubber and multifunctional monomers, with at least one multifunctional monomer, and at least one free radical generator such as a peroxide.

The mEPDM rubber is a copolymer of ethylene; a $C_3$ to $C_{40}$ alpha-olefin (preferably propylene or butene, most preferably propylene) and at least one non-conjugated diene. Although the discussions are directed towards mEPDM rubbers comprising propylene-derived units as the $C_3$ to $C_{40}$ alpha-olefin, one of skill in the art would appreciate that mEPDM rubbers, comprising other (non-propylene) $C_4$ to $C_{40}$ alpha-olefins, can be used in the compositions and processes of this invention.

Preferably, the mEPDM comprises from 40 wt % to 80 wt % of ethylene-derived units, more preferably from 40 wt % to 75 wt % ethylene-derived units, and from 0.3 wt % to 15 wt % of one or more diene-derived units. The mEPDM comprises preferably from 0.3 wt % to 15 wt % non-conjugated diene-derived units (preferably from 0.3 wt % to 10.0 wt %, preferably from 0.3 wt % to 5 wt %). The balance of the mEPDM comprises $C_3$ to $C_{40}$ alpha-olefin (preferably propylene or butene, most preferably propylene)-derived units.

In some embodiments of this invention, the mEPDM rubber comprises at least 50 wt % ethylene derived units, based on total weight of the mEPDM rubber.

Ethylene content is determined by ASTM D3900, and is not corrected for diene content. ENB content incorporated in the polymer is determined by FTIR, ASTM D6047. The diene content of a terpolymer comprising 5-vinyl-2-norbornene (VNB) is preferably measured via $^1H$ NMR. These methods measure available unsaturation. Thus, the measured incorporation may be lower than the actual incorporation because dienes having pendant unsaturated moieties have been converted, e.g., by hydrogen, and are not detected in the measurement. If both ENB and VNB are present, $^{13}C$ NMR is preferably used to determine diene content.

Suitable non-conjugated dienes include straight or branched chain hydrocarbon di-olefins or cycloalkenyl-substituted alkenes, having about 6 to about 15 carbon atoms, such as for example: (a) straight chain acyclic dienes, such as 1,4-hexadiene and 1,6-octadiene; (b) branched chain acyclic dienes, such as 5-methyl-1,4-hexadiene, 3,7-dimethyl-1,6-octadiene, and 3,7-dimethyl-1,7-octadiene; (c) single ring alicyclic dienes, such as 1,4-cyclohexadiene, 1,5-cyclo-octadiene and 1,7-cyclododecadiene; (d) multi-ring alicyclic fused and bridged ring dienes, such as tetrahydroindene, norbornadiene, methyl-tetrahydroindene, dicyclopentadiene (DCPD), bicyclo-(2.2.1)-hepta-2,5-diene, alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Preferred non-conjugated dienes are 5-ethylidene-2-norbornene (ENB), 1,4-hexadiene, dicyclopentadiene (DCPD), norbornadiene, and 5-vinyl-2-norbornene (VNB), with ENB being most preferred. Note that throughout this application the terms "non-conjugated diene" and "diene" are used interchangeably.

The mEPDM rubbers, before modification, are preferably not highly branched. The branching index, g'(vis), is preferably in the range of 0.95 to 1.0 (preferably 0.98 to 1.0; preferably 0.99 to 1.0).

The mEPDM rubbers, before modification, preferably have a narrow MWD. Preferably, the mEPDM rubbers have a MWD in the range of from 1.5 to 5 (preferably 1.5 to 4.0, preferably from 1.8 to 3.5).

Because most mEPDM rubbers are either amorphous or having very low crystallinity, compositional distribution (CD) of these rubbers cannot be determined from the conventional TREF (Temperature Rising Elution Fractionation) technique typically used for semi-crystalline polyolefins. These rubbers, dissolved in 1,2 ortho-dichlorobenzene (oDCB), will elute at −15° C. as the soluble fraction. For this reason, High Temperature Interactive Liquid Chromatography (HTILC) is used to characterize the chemical CD of mEPDM rubbers. The mEPDM rubbers, before modification, preferably have an elution volume less than about 11 mL (preferably less than about 10.5 mL) as determined by this technique using a porous graphitic carbon (Hypercarb™, Thermo Scientific, Dreieich, Germany) as the stationary phase and 1-decanol and 1,2,4-trichlorobenzene (TCB, VWR, Darmstadt, Germany) at 160° C. as the mobile phase to form a linear gradient of 1-decanol/TCB. The experimental procedures were detailed in J. Polym. Sci. Part A: Polym. Chem., 49, 1840-1846, 2011 and in Polymer, 50, 5443-5448, 2009. A linear polyethylene with Mw=235 kg/mol (purchased from PSD Polymers, Linz, Austria) was used as the standard. This standard has an elution volume of 12.09 mL. An elution volume below 12.09 ml suggests that the methylene sequence in EPDM is not long enough to form blockiness. In other words, the ethylene-derived units, the propylene-derived units, and the diene-derived units are distributed randomly along the EPDM chain and the CD of these chains is narrow. Without being bound by theory, it is believed that the treatment of EPDM with a free radical generator as a radical initiator and a multifunctional monomer able to graft is more effective if the ethylene-derived units, the propylene-derived units and the diene-derived units are distributed more randomly in the backbone EPDM and the EPDM has a narrower CD. Using this HTILC technique, mEPDM 2 in the Examples below has an elution volume of 9.95 mL.

In some embodiments of this invention, the mEPDM has a MLRA of less than 500 (preferably less than 450, preferably less than 350).

Useful commercial mEPDM rubbers include those available from ExxonMobil Chemicals, Dow Chemical Company, Mitsui Chemicals, Inc., and LANXEXX Elastomers under the trade names of VISTALON, NORDEL, Mitsui EPT, and KELTAN, respectively.

Multifunctional Monomers

"Multifunctional monomers," as used herein, means a molecule capable of being polymerized that has two or more functional groups, which may be the same or different, capable of being polymerized. For example, 3,9-divinyl-2,4,8,10-tetraoxaspiro[5,5]undecane is a multifunctional monomer for the purposes of this invention because it has two vinyl groups capable of being polymerized, as represented in the structure below:

Another example is triallyl 1,3,5-benzenetricarboxylate, which is multifunctional, because it has three allyl groups capable of being polymerized.

Functional groups capable of being polymerized include unsaturated groups such as vinyls, vinylidenes, vinylenes, acrylates, allylic groups, and the like.

The process for producing highly branched compositions comprises contacting from about 0.1 wt % to about 4 wt % (preferably from about 0.5 wt % to about 3.5 wt %, preferably from about 0.5 wt % to about 3 wt %, preferably from about 1 wt % to about 2.5 wt %, preferably from about 1.5 wt % to about 2 wt %) of at least one multifunctional monomer, based on the total weight of the rubber and multifunctional monomers; the multifunctional monomer being contacted with at least one mEPDM rubber and at least one free radical generator.

Suitable multifunctional monomers include one or more vinyl compounds, allylic compounds, acrylate compounds, or combinations thereof.

Suitable vinyl compounds include 3,9-divinyl-2,4,8,10-tetraoxaspiro[5,5]undecane (DVTU), 2,5-norbornadiene, divinylphenylphosphine, divinyl sulfone, divinyl sulfoxide, 1-3-divinyltetramethyldisiloxane, 1,2 polybutadiene, divinyl benzene, and combinations thereof.

Suitable allylic compounds include triallyl trimesate, triallyl trimellitate, diallyl terephthalate, diallyl isophthalate, diallyl phthalate, triallylcyanurate, triallylisocyanurate, triallylamine, triallyl 1,3,5-benzenetricarboxylate, triallylphosphine, triallyl phosphate, 1,3,5-triallyl-1,3,5-triazine-2,4,6 (1H,3H,5H)-trione, and combinations thereof.

Suitable acrylate compounds include triallyl 1,3,5-benzenetricarboxylate, trimethylolpropane trimethacrylate, trimethylolpropane triacrylate, trimethylolpropane propoxylate triacrylate, polyethylene glycol dimethacrylate, ethylene glycol dimethacrylate, triethylene glycol diacrylate, pentaerythritol triacrylate, pentaerythritol tetraacrylate, pentaerythritol tetramethacrylate, 1,4-butanediol diacrylate, 1,6-hexanediol diacrylate, and combinations thereof.

Useful multifunctional monomers may be either solids or liquids at ambient temperature. Suitable solid multifunctional monomers have a melting point above room temperature, such as, a melting point of at least 25° C., preferably 28° C. or more, 29° C. or more, 30° C. or more, 31° C. or more, or 32° C. or more. The melting point can range from a low of about 25° C., 29° C., or 33° C. to a high of about 37° C., 43° C., or 53° C.

Free Radical Generators

The process for producing highly branched compositions comprises contacting at least one free radical generator (preferably from about 0.1 wt % to about 4 wt %, preferably from about 0.5 wt % to about 3.5 wt %, preferably from about 0.5 wt % to about 3 wt %, preferably from about 1 wt % to about 2.5 wt %, preferably from about 1.5 wt % to about 2 wt %, based on the total weight of the rubber and multifunctional monomers) with the mEPDM and the multifunctional monomer.

In this invention, useful free radical generators include organic peroxides such as diaryl peroxides, ketone peroxides, peroxydicarbonates, peroxyesters, dialkyl peroxides, hydroperoxides, benzoyl peroxides, lauroyl peroxides, di-t-butyl peroxide, dicumyl peroxide, t-butylcumyl peroxide, t-butyl peroctoate, p-di(t-butylperoxy)diisopropylbenzene, 2,5-dimethyl-2,5-di(t-butylperoxy)hexane, 1,1-di(t-butylperoxy)-3,3,5-trimethylcyclohexane, 2,5-dimethyl-2,5-di(t-butylperoxy)hexene-3, t-butyl-peroxy-(cis-3-carboxy)propenoate, 1,1-di(t-amylperoxy)cyclohexane, t-amyl-(2-ethylhexyl) peroxycarbonate, t-butylperoxy-3,5,5-trimethylhexanoate, t-butyl peroxybenzoate, and mixtures thereof.

In particular, the organic peroxide may be one or more of benzoyl peroxide, methyl ethyl ketone peroxide, tert-butyl peroxy benzoate, tert-butyl perbenzoate, tert-butylperoxy acetate, tert-butyl(2-ethylhexyl)monoperoxy carbonate, n-butyl-4,4-di-(tert-butyl peroxy)valerate, 1,1-bis(tert-butylperoxy)cyclohexane, 1,1-bis(tert-butylperoxy)-3,3,5-trimethylcyclohexane, 2,2-bis(tert-butylperoxy)butane, tert-butylcumylperoxide, bis-(tert-butylperoxy isopropyl) benzene, di-tert-butylperoxide, 2,5-dimethyl-2,5-di(tert-butylperoxy)hexane, cyclohexanone peroxide, t-butylperoxyisopropyl carbonate, di-ti-butyl terphthalate, 2,5-dimethyl-2,5-di(t-butylperoxy)hexene, 2,5-dimethyl-2,5-di(t-butylperoxy)hexyne-3, di-(tert-amyl)peroxide, bis(alpha-methylbenzyl)peroxide, benzoyl peroxide, 3,6,9-triethyl-3,6,9-trimethyl-1,4,7-triperoxonane, bis(tert-butylperoxy)-diisopropylbenzene, di-tert-butyl peroxide, cumene hydroperoxide, tert-butyl hydroperoxide, hydroperoxides, dilauryl peroxide, dicumyl peroxide, derivatives thereof, or combinations thereof.

Peroxides having a 1 minute half-life at temperatures of less than 200° C. (preferably less than 185° C., preferably less than 170° C.) are preferred. Blends of peroxides having different activation temperatures can be utilized to more precisely control the grafting process. Peroxides useful herein are available from a variety of commercial suppliers, including LUPEROX™ from Arkema (France), TRIGONOX™ and PERKADOX™ from Akzo Nobel (Netherlands), and VAROX™ from R. T. Vanderbilt (Norwalk, Conn.), either as a liquid product, a solid product, or as a concentrated assay on an inorganic support.

Although organic peroxides are discussed above, any free radical generator capable of generating a free radical in EPDM is considered within the scope of this application.

The mEPDM, multifunctional monomer, and peroxide may be combined in any order. These reactants can be in solid or liquid form. Typically, the mEPDM is in a solid form. Free radical generators may be selected to be solids. If all the process components are solids, they can be tumble mixed with the mEPDM before being introduced into a reaction zone.

The reactants are typically combined or contacted with each other in a reaction zone, such as a BRABENDER™ mixer, an extruder, mill equipment, a reaction vessel, or a stirred tank reactor. Preferably, the process is carried out without the use of a solvent (if solvent is used, preferably the solvent is less than 1 wt %, based on the total weight of the mEPDM and the multifunctional monomers) but an inert oil can be used. Preferably, the process of this invention occurs in the melt phase. Preferably, the process of this invention occurs in a mixer such as a BRABENDER™ mixer. Preferably, the process occurs at a temperature in the range of from about 60° C. to about 300° C. and more preferably from about 100° C. to about 250° C.

The process may be batch, semi-batch, or continuous. As used herein, the term "continuous" means a system that operates without interruption or cessation. For example, a continuous process to produce a polymer would be one where the reactants are continually introduced into one or more reactors and polymer product is continually withdrawn. Accordingly, reactive blending may be accomplished using a batch mixer (BRABENDER™ mixer, two roll mill, etc.) or a continuous mixer (single screw extruder, twin screw extruder, etc.). A highly branched mEPDM composition is thereby obtained.

Optionally, the highly branched composition may also include one or more polymer additives, such as reinforcing and non-reinforcing fillers, scratch resistant agents, plasticizers, antioxidants, heat stabilizers, extender oils, lubricants, antiblocking agents, antistatic agents, anti-fogging agent, waxes, foaming agents, pigments, flame/fire retardants, dyes and colorants, ultraviolet absorbers, and nano-fillers. Other additives include, for example, blowing agents, processing aids, tackifying resins, and other processing aids known in the polymer compounding art. The lists described herein are not intended to be inclusive of all types of additives which can be employed with the present invention. Upon reading this disclosure, those of skill in the art will appreciate other additives can be employed to enhance properties. As is understood by the skilled in the art, the blends of the present invention can be modified to adjust the characteristics of the blends as desired. The aforementioned additives can be either added independently or incorporated into an additive or masterbatch. Such additives can comprise up to about 70 wt %, more preferably up to about 65 wt %, of the total additive or masterbatch composition.

Also, optionally, the highly branched composition may include one or more slip agents or mold-release agents to facilitate moldability, preferably present at 50 ppm to 10 wt %, more preferably 50 ppm to 5000 ppm, even more preferably 0.01 wt % to 0.5 wt % (100 ppm to 5000 ppm), even more preferably 0.1 wt % to 0.3 wt % (1000 ppm to 3000 ppm), based upon the weight of the composition. Desirable slip additives include, but are not limited to, saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones, and cured silicones); sodium alkylsulfates, alkyl phosphoric acid esters; stearates (such as zinc stearate); and mixtures thereof. Preferred slip additives are unsaturated fatty acid amides, which are available from Crompton (Kekamide™ grades) and Croda Universal (Crodamide™ grades). Particularly preferred are the erucamide and oleamide versions of unsaturated fatty acid amides. Preferred slip agents also include amides having the chemical structure $CH_3(CH_2)_7CH=CH(CH_2)_xCONH_2$ where x is 5 to 15. Particularly preferred amides include: 1) Erucamide $CH_3(CH_2)_7CH=CH(CH_2)_{11}CONH_2$ which can also be referred to as cis-13-docosenoamide (Erucamide is commercially available from Akzo Nobel Amides Co. Ltd. under the trade name ARMOSLIP E); 2) Oleylamide $CH_3(CH_2)_7CH=CH(CH_2)_8CONH_2$; and 3) Oleamide which can also be preferred to as N-9-octadecenyl-hexadecanamide $CH_3(CH_2)_7CH=CH(CH_2)_7CONH_2$. In another embodiment, stearamide is also useful in this invention. Other preferred slip additives include those described in WO 2004/005601A1.

The highly branched mEPDM composition may be used by itself as a polymer (neat) or it may be blended as a modifier into a selected base polymer to form a homogenous blend. These homogenous blends and processes to produce them are discussed below.

Homogeneous Blends

This invention also relates to homogeneous blends, comprising:
(1) up to about 99 wt % (preferably from about 50 wt % to about 97 wt %, preferably from about 60 wt % to about 95 wt %, preferably from about 65 wt % to about 90 wt %) of at least one olefin based polymer having a g'(vis) of greater than about 0.90 (preferably greater than about 0.90 and less than about 1.0);
(2) at least 1 wt % (preferably from about 3 wt % to about 50 wt %, preferably from about 5 wt % to about 50 wt %, preferably from about 10 wt % to about 50 wt %, preferably from about 15 wt % to about 40 wt %) of a highly branched composition, based on the total weight of the homogeneous blend, comprising:
  (i) from about 96 wt % to 99.9 wt % (preferably from about 96.5 wt % to about 99.5 wt %, preferably from about 97 wt % to about 99 wt %, preferably from about 97.5 wt % to about 98.5 wt %) metallocene catalyzed ethylene propylene diene derived units, based on the total weight of the composition;
  (ii) from about 0.1 wt % to about 4 wt % (preferably from about 0.5 wt % to about 3.5 wt %, preferably from about 0.5 wt % to about 3 wt %, preferably from about 1 wt % to about 2.5 wt %, preferably from about 1.5 wt % to about 2 wt %) multifunctional monomer derived units, based on the total weight of the composition;
wherein the highly branched composition has:
  (a) a Mooney viscosity ML (1+4) at 125° C. of about 30 to 100 MU (preferably about 40 to 100, preferably about 50 to 100, preferably about 60 to 100);
  (b) a Mooney relaxation area MLRA of about 100 to about 1000 (preferably about 200 to 1000, preferably about 300 to 1000, preferably about 450 to 950);
  (c) a branching index, g'(vis) of less than about 0.9 (preferably less than about 0.85, preferably less than about 0.80);
  (d) a phase angle, δ, of less than about 55 degrees (preferably less than about 50 degrees, preferably less than about 45 degrees) at a complex modulus of 10 kPa, measured at 190° C.;
  (e) a degree of shear thinning greater than about 0.95 (preferably greater than about 0.96, preferably greater than about 0.97), measured at 190° C.; and
  (f) optionally, an increase in relaxation time, defined as (MLRA)/[ML (1+4)], of at least 15%, preferably at least 30%, preferably at least 50%, relative to the precursor mEPDM.

Homogeneous blends, as used herein, means free from visible gels. Preferably, the homogeneous blends of this invention have less than 1 wt % of insoluble material, when the blend is dissolved in boiling xylenes. In case of conflict, this test will be used to determine the % gels in blends.

The homogenous blends of this invention comprise (1) at least one olefin based polymer having a g'(vis) of greater than about 0.90 and (2) a highly branched composition.

The homogeneous blends of this composition may comprise at least 1 wt % (preferably from about 3 wt % to about 50 wt %, preferably from about 5 wt % to about 50 wt %, preferably from about 10 wt % to about 50 wt %, preferably from about 15 wt % to about 40 wt %) of the highly branched composition, based on the total weight of the homogeneous composition. The highly branched composition is as discussed above.

Olefin Based Polymer

When the highly branched composition is used as a modifier, it may be blended into a base polymer. The homogeneous blends of this composition may comprise up to about 99 wt % (preferably from about 50 wt % to about 97 wt %, preferably from about 60 wt % to about 95 wt %, preferably from about 65 wt % to about 90 wt %) of the base polymer. In this invention, the base polymer comprises at least one olefin based polymer having a g'(vis) of greater than about 0.90. In some embodiments of this invention, the olefin based polymer has a g'vis of greater than about 0.90 and less than or equal to about 1.0. As above, such polymers are considered linear polymers for the purpose of this invention.

Useful olefin based polymers include mEPDM rubbers, polyolefins such as polypropylene, polyethylene, ethylene-propylene copolymer, ethylene-propylene-ENB-VNB tetrapolymer, propylene-ethylene copolymer, propylene-ethylene-diene terpolymer, plastomer, random copolymer (RCP), impact copolymer (ICP), and the like.

In some embodiments, the olefin based polymer has an $M_w$ of 100,000 g/mol or more (preferably an Mw of 75,000 or more, preferably an Mw of 100,000 or more, preferably an Mw of 150,000 or more, preferably an Mw of 200,000 or more, preferably an Mw of 250,000 or more), a g'(vis) of 0.95 or more (preferably a g'(vis) of 0.96 or more, preferably a g'(vis) of 0.97 or more, preferably a g'(vis) of 0.98 or more, preferably a g'(vis) of 0.99 or more, and, optionally, preferably a g'(vis) of 1.0 or less), and an Mw/Mn of from 1 to 10 (preferably from about 1.2 to about 9.5, preferably from about 1.5 to about 8, preferably from about 2.5 to about 7.5, preferably from about 3 to about 6). In some embodiments, the olefin based polymer comprises from 50 mol % to 100 mol % ethylene and from 0 mol % to 50 mol % of $C_3$ to $C_{40}$ comonomer. In some embodiments, the olefin based polymer comprises from 50 mol % to 100 mol % propylene and from 0 mol % to 50 mol % of ethylene and/or $C_4$ to $C_{40}$ comonomer.

Properties of the Homogeneous Blends

The homogeneous blends of the present invention have a new and useful combination of properties that allow them to be more useful than traditional mEPDM rubber blends.

Stress-Strain Properties

The homogeneous blends have a Young's modulus, $E_o$, of at least 45% or more (preferably 50% or more, preferably 55% or more, preferably 60% or more) of the Young's modulus of the olefin based polymer. Preferably, the homogeneous blends have a Young's modulus, $E_o$, of 1.99 MPa or less (preferably 1.90 MPa or less, preferably 1.8 MPa or less, preferably 1.7 MPa or less, preferably 1.3 MPa or less).

The homogeneous blends also have a 100% modulus, E100, of at least 77% or more (preferably 80% or more, preferably 85% or more, preferably 90% or more) of the 100% modulus of the olefin based polymer. Preferably, the homogeneous blends have a 100% modulus, E100, of 0.18 MPa or less (preferably 0.17 or less, preferably 0.15 or less).

The homogeneous blends also have a strain at which the stress is maximized, $e_m$, equal to or higher than the strain at which the stress is maximized of the olefin based polymer.

The homogeneous blends also have a maximum stress, $\sigma_m$, of at least 74% or more (preferably 76% or more, preferably 80% or more, preferably 85% or more) of the maximum stress of the olefin based polymer. Preferably, the homogeneous blends also have a maximum stress, $\sigma_m$, of 0.25 MPa or less (preferably 0.23 MPa or less, preferably 0.20 MPa or less, preferably 0.18 MPa or less).

The homogeneous blends also have a strain at break, $e_b$, of 95% or more (preferably 96% or more, preferably 97% or more) of the strain at break of the olefin based polymer. Preferably, the homogeneous blends also have a strain at break, $e_b$, of 250% or less (preferably 220% or less, preferably 200% or less).

The homogeneous blends also have a stress at break, $\sigma_b$, of at least 50% or more (preferably at least 55% or more, preferably at least 60% or more, preferably at least 60% or more) of the stress at break of the olefin based polymer.

Additionally, the homogeneous blends have a tensile toughness, U, of at least 72% or more (preferably 75% or more, preferably 78% or more, preferably 85% or more) of the tensile toughness of the olefin based polymer.

These stress-strain properties are measured using ASTM D638 at 23° C. with the following modifications. Polymers and the BRABENDER™ mixes were compression-molded into plaques with a thickness of about 0.7 mm and a thickness of about 2 mm. A press at 180° C., a molding time of 15 min, and a press force of 25 tons were used.

In the stress-strain experiments, the molded plaques with a thickness of about 2 mm are die-cut into micro-dumbbell specimens (the base was ~1 cm×1 cm and the center, narrow strip was ~0.6 cm×0.2 cm). Stress-strain measurements under tension are then performed in an INSTRON™ tester. Measurements using triplicate samples (conditioned under ambient conditions for 24 hr prior to tests) are performed at room temperature and at a separation speed of 2"/min=850 μm/s until each dumbbell sample was broken. The stress is calculated based on the undeformed cross-sectional area of the test specimen. Strain measurements are based on clamp separation. From these stress-strain data points, the whole stress-strain curve is constructed. Tensile parameters, such as the Young's modulus ($E_o$, obtained from the initial slope of the stress-strain curve), the strain at which stress is maximized ($e_m$), the maximum stress ($\sigma_m$), the modulus at 100% strain ($E_{100}$), the strain at break ($e_b$), the tensile strength ($\sigma_b$), and the tensile toughness (U), calculated as the total area under the stress-strain curve) are then determined Melt Properties A blend composition of linear EPDM and the highly branched EPDM polymer composition shows improved melt elasticity or melt strength, but decreased melt viscosity (also referred to as complex viscosity) compared to the neat linear EPDM when the concentration of the highly branched EPDM polymer composition in the blend is 30 wt % or higher. For example, melt elasticity or melt strength is improved when the phase angle (δ) at a complex modulus of 10 kPa measured at 190° C. is lower than about 58° and the complex melt viscosity between 0.01 to 100 rad/s measured at 190° C. is decreased by at least 22%, preferably by at least 23%, preferably by at least 24%, relative to the linear EPDM.

Process to Produce Homogeneous Blends

This invention even further relates to processes for producing a homogeneous blend comprising:

(a) mixing:
  (1) up to about 99 wt % (preferably from about 50 wt % to about 97 wt %, preferably from about 60 wt % to about 95 wt %, preferably from about 65 wt % to about 90 wt %) of at least one olefin based polymer having a g'(vis) of greater than about 0.90 (preferably greater than about 0.90 and less than about 1.0);
  (2) at least 1 wt % (preferably from about 3 wt % to about 50 wt %, preferably from about 5 wt % to about 50 wt %, preferably from about 10 wt % to about 50 wt %, preferably from about 15 wt % to about 40 wt %) of a highly branched composition, based on the total weight of the homogeneous blend, comprising:
    (i) from about 96 wt % to about 99.9 wt % (preferably from about 96.5 wt % to about 99.5 wt %, preferably from about 97 wt % to about 99 wt %, preferably from about 97.5 wt % to about 98.5 wt %) metallocene catalyzed ethylene propylene diene derived units, based on the total weight of the composition;
    (ii) from about 0.1 wt % to about 4 wt % (preferably from about 0.5 wt % to about 3.5 wt %, preferably from about 0.5 wt % to about 3 wt %, preferably from about 1 wt % to about 2.5 wt %, preferably from about 1.5 wt % to about 2 wt %) multifunctional monomer derived units, based on the total weight of the composition;
  wherein the highly branched composition has:
    (a) a Mooney viscosity ML (1+4) at 125° C. of about 30 to 100 MU (preferably 40 to 100, preferably 50 to 100, preferably 60 to 100);
    (b) a Mooney relaxation area MLRA of about 100 to about 1000 (preferably 200 to 1000, preferably 300 to 1000, preferably 450 to 950);
    (c) a branching index, g'(vis) of less than about 0.9 (preferably less than about 0.85, preferably less than 0.80);
    (d) a phase angle, δ, of less than about 55 degrees (preferably less than about 50 degrees, preferably less than about 45 degrees) at a complex modulus of 10 kPa, measured at 190° C.;
    (e) a degree of shear thinning greater than about 0.95 (preferably greater than 0.96, preferably greater than 0.97), measured at 190° C.;
    (f) optionally, an increase in relaxation time, defined as (MLRA)/[ML (1+4)], of at least 15% (preferably at least 30%, preferably at least 50%), relative to the precursor mEPDM.

(b) obtaining a homogeneous blend;
wherein the homogeneous blend preferably has one or more of the following properties:
  (1) a Young's modulus, $E_o$, of at least 45% (preferably 50% or more, preferably 55% or more, preferably 60% or more) or more of the Young's modulus of the olefin based polymer;
  (2) a 100% modulus, E100, of at least 77% or more (preferably 80% or more, preferably 85% or more, preferably 90% or more) of the 100% modulus of the olefin based polymer;
  (3) a strain at which the stress is maximized, $e_m$, equal to or higher than the strain at which the stress is maximized of the olefin based polymer;

(4) a maximum stress, $\sigma_m$, of at least 74% or more (preferably 76% or more, preferably 80% or more, preferably 85% or more) of the maximum stress of the olefin based polymer;
(5) a strain at break, $e_b$, of 95% or more (preferably 96% or more, preferably 97% or more) of the strain at break of the olefin based polymer;
(6) a stress at break, $\sigma_b$, of at least 50% (preferably at least 55% or more, preferably at least 60% or more, preferably at least 60% or more) or more of the stress at break of the olefin based polymer; and
(7) a tensile toughness, U, of at least 72% or more (preferably at least 75% or more, preferably at least 78% or more, preferably 85% or more) of the tensile toughness of the olefin based polymer.

The highly branched composition and the olefin based polymer may be blended in any manner known in the art. The reactants may be tumble mixed with the mEPDM before the mixing step (i).

The reactants are typically mixed or contacted with each other in a reaction zone, such as a BRABENDER™ mixer, an extruder, mill equipment, a reaction vessel or a stirred tank reactor. Preferably, the process is carried out without the use of a solvent. Preferably, the process of this invention occurs in the melt phase. Preferably, the process of this invention occurs in a mixer such as a BRABENDER™ mixer or an extruder. Preferably, the process occurs at a temperature in the range of from about 60° C. to about 300° C. and more preferably from about 100° C. to about 250° C.

The process may be batch, semi-batch, or continuous. As used herein, the term "continuous" means a system that operates without interruption or cessation. Accordingly, the reactive blending may be accomplished using a batch mixer (BRABENDER™ mixer, two roll mill, etc.) or a continuous mixer (single screw extruder, twin screw extruder, etc.). A homogenous blend is thereby obtained.

Optionally, the homogenous blends may also include one or more polymer additives, as described above.

Uses of Highly Branched Compositions and Homogeneous Blends

This invention also relates to articles comprising the highly branched compositions and/or the homogeneous blends disclosed herein.

The highly branched compositions and homogenous blends of this invention may find utility in the automotive industry in applications such as weather-strip profiles, belts, tubing, (radiator) hoses, and seals, due to its outstanding weathering and heat resistance properties.

These compositions and blends may also be used in building and construction as sealing profiles, roofing foil or membrane, and seals; in electrical wire and cable as extruded insulation and jacketing because of its excellent dielectric and aging properties.

These highly branched mEPDM rubbers and their blends may also be used in appliances in a whole array of mostly molded articles. Another use for highly branched mEPDM rubbers is in blends with general purpose rubbers such as NR and SBR, by virtue of EPDM's better ozone and thermal resistance with the host rubber comprising the principal portion of the blend. This blend approach has been applied for improving the ozone and weathering resistance of the tire sidewalls and cover strips.

Another use of the highly branched mEPDM composition of this invention is to blend with thermoplastics, such as polypropylene (PP). A thermoplastic elastomer is obtained if EPDM is increased to be the larger component and this rubbery phase is vulcanized during the mixing with PP (dynamic vulcanization). These will suppress the flow of the EPDM phase and provide the end product with sufficient dimensional stability.

EXAMPLES

Test Methods

Heat of Fusion ($H_f$) and Melting Temperature ($T_m$)

The melting temperature $T_m$ of the polymers and blends were measured using a DSC Q100 equipped with 50 auto-samplers from TA Instruments. This DSC was calibrated with an indium standard weekly. Typically, 6-10 mg of a polymer was sealed in an aluminum pan with a hermetic lid and loaded into the instrument. In a nitrogen environment, the sample was first cooled to −90° C. at 20° C./min. The sample was heated to 220° C. at 10° C./min and melting data (first heat) were acquired. This provides information on the melting behavior under as-received conditions, which can be influenced by thermal history as well as sample preparation method. The sample was then equilibrated at 220° C. to erase its thermal history.

Crystallization data (first cool) were acquired by cooling the sample from the melt to −90° C. at 10° C./min and equilibrated at −90° C. Finally, the sample was heated again to 220° C. at 10° C./min to acquire additional melting data (second heat). The endothermic melting transition (second heat) was analyzed for peak temperature as $T_m$ and for area under the peak as heat of fusion ($H_f$).

Materials

The free radical generator, dicumyl peroxide (DCP, melting point=39° C.-41° C.) and the multifunctional-functional monomer, 3,9-divinyl-2,4,8.10-tetraoxaspiro[5,5]undecane (DVTU, melting point=43° C.-46° C.), were obtained from Sigma-Aldrich (St. Louis, Mo.) and used as received. Both chemicals are solids at room temperature.

The ethylene propylene diene terpolymer rubbers in Table 1 were used in the inventive and comparative Examples below.

TABLE 1

EPDM Rubbers Used In Examples

| EPDM Tradename | Source | Catalyst* |
|---|---|---|
| mEPDM 1 | ExxonMobil Chemical Co., Baytown, TX | MCN |
| mEPDM 2 | ExxonMobil Chemical Co., Baytown, TX | MCN |
| znEPDM 1 | ExxonMobil Chemical Co., Baytown, TX | ZN |
| znEPDM 2 | ExxonMobil Chemical Co., Baytown, TX | ZN |

*MCN is metallocene; ZN is Ziegler-Natta.

These polymers were further characterized, and the results shown in Table 2.

TABLE 2

Further Characterization of EPDM Rubbers Used in the Examples

| EPDM | mEPDM 1 | mEPDM 2 | znEPDM 1 | znEPDM 2 |
|---|---|---|---|---|
| $Mw^1$ (kg/mol) | 174 | 283 | 348 | 366 |
| $Mw/Mn^2$ | 3.69 | 2.70 | 3.26 | 3.21 |
| g' (vis) | 1.002 | 0.941 | 0.772 | 0.760 |
| C2 (wt %)[3] | 50.4 | 55.7 | 55.5 | 57.5 |
| $ENB^4$ (wt %) | 4.0 | 5.4 | 5.7 | 8.9 |
| Tm (° C.) | Nil+ | −24 | −20 | −16 |
| Hf (° C.) | 0 | 5.0 | 1.8 | 6.6 |

TABLE 2-continued

Further Characterization of EPDM Rubbers Used in the Examples

| EPDM | mEPDM 1 | mEPDM 2 | znEPDM 1 | znEPDM 2 |
|---|---|---|---|---|
| Tg (° C.) | −51 | −50 | −50 | −46 |
| DMTA Loss Modulus Max (° C.) | −52 | −51 | −50 | −46 | components were incorporated in the EPDM. Finally the blend was discharged from the mixer, cut into small pieces, and allowed to cool down. These small pieces of rubber were then placed in a vacuum oven at about 100° C. to 110° C. for about 12 hours to remove any residual decomposition products.

Unmodified mEPDM 1 (C-1, C-2, and C-3), unmodified znEPDM 1 (C-4), and unmodified znEPDM2 (C-5), provided comparative data. Properties of the comparative samples and the modified EPDMs are shown in Table 3.

TABLE 3

Properties of Comparative and Modified EPDM Materials

| Sample ID | DCP (wt %) | DVTU (wt %) | Mixing Time (min) | $M_w$*, (kg/mol) | $M_w/M_n$** | g' (vis) | $C_2$, wt % | ENB wt % | ML (1 + 4)+ | MLRA | MLRA/ ML(1 + 4) (s) |
|---|---|---|---|---|---|---|---|---|---|---|---|
| C-1 | — | — | — | 174 | 3.69 | 1.002 | 50.4 | 4.0 | 29 | 94 | 3.24 |
| C-2 | — | — | 10 | 151 | 3.72 | 0.972 | 50.1 | 4.3 | 29 | 85 | 2.93 |
| C-3 | — | — | 20 | 161 | 3.54 | 1.003 | 50.1 | 4.3 | 29 | 83 | 2.86 |
| 78-1 | 0.11 | 0 | 10 | 123 | 2.58 | 1.006 | 50.2 | 3.9 | 25 | 74 | 2.96 |
| 78-2 | 0.11 | 0 | 20 | 146 | 2.90 | 0.942 | 50.7 | 3.6 | 23 | 87 | 3.78 |
| 82-1 | 0.16 | 0 | 10 | 140 | 2.86 | 0.958 | 50.0 | 3.8 | 29 | 144 | 4.97 |
| 82-2 | 0.16 | 0 | 20 | 171 | 3.46 | 0.831 | 50.6 | 3.4 | 25 | 157 | 6.28 |
| 55-1 | 0.23 | 0 | 10 | 254 | 4.16 | 0.782 | 50.4 | 3.2 | 40 | 541 | 13.5 |
| 55-1# | 0.23 | 0 | 10 | 195 | 4.66 | 0.799 | 49.8 | 3.7 | — | — | 15.2 |
| 55-3 | 0.23 | 0 | 20 | 263 | 4.79 | 0.715 | 50.4 | 2.9 | 43 | 654 | — |
| 55-3# | 0.23 | 0 | 20 | 247 | 5.47 | 0.703 | 49.3 | 3.6 | — | — | — |
| 55-2 | 0.23 | 0.11 | 10 | 215 | 4.50 | 0.786 | 49.8 | 3.2 | 45 | 656 | 14.6 |
| 55-2# | 0.23 | 0.11 | 10 | 206 | 4.81 | 0.788 | 49.6 | 3.6 | — | — | 14.5 |
| 55-4 | 0.23 | 0.11 | 20 | 266 | 4.86 | 0.676 | 50.4 | 2.9 | 45 | 652 | — |
| 55-4# | 0.23 | 0.11 | 20 | 231 | 5.53 | 0.689 | 49.7 | 3.5 | — | — | — |
| C-4 | — | — | — | 348 | 3.26 | 0.772 | 55.5 | 5.7 | 90 | 790 | 8.78 |
| C-5 | — | — | — | 366 | 3.21 | 0.760 | 57.5 | 8.9 | 89 | 880 | 9.89 |

*$M_w$ values were determined from GPC-light scattering (LS).
**$M_w/M_n$ values were determined from GPC-differential refractive index (DRI).
+Measured at 125° C.
Additional thermomechanical treatment by compression molding of the BRABENDER™ mix at 150° C. for 25 min.

TABLE 2-continued

Further Characterization of EPDM Rubbers Used in the Examples

| EPDM | mEPDM 1 | mEPDM 2 | znEPDM 1 | znEPDM 2 |
|---|---|---|---|---|
| DMTA Loss Tangent Max (° C.) | −48 | −44 | −44 | −40 |
| ML (1 + 4), 125° C. | 29 | 81 | 90 | 89 |
| MLRA | 94 | 323 | 790 | 880 |

[1]$M_w$ values were determined from GPC-light scattering (LS).
[2]$M_w/M_n$ values were determined from GPC-differential refractive index (DRI).
[3]The ethylene content (wt % $C_2$) shown in this and subsequent tables is the apparent value (i.e. wt % in the EP portion of EPDM). The true ethylene content can be calculated from the equation: true wt % $C_2$ = (apparent wt % $C_2$)(100 − wt % ENB)/100).
[4]ENB means ethylidenenorbornene.
+Nil means no melting temperature or crystallinity detected, completely amorphous.

Example 1

General Process Methods mEPDM 1 (220 g), DCP (0.25, 0.35 or 0.5 g), and DVTU (0 or 0.25 g) were accurately weighed according to the formulation described in Table 3. A BRABENDER™ mixer (250 g capacity) was heated to 150° C. mEPDM 1 was introduced into the preheated BRABENDER™ mixer and mixing was started. A rotor speed of 50 rpm was used throughout the run and the system was kept at temperature desired and stable. After the mEPDM 1 was mixed with itself for 2 min, DCP or the mixture of DCP and DVTU was put in the mixer. Mixing was continued for either 10 or 20 min once all the blend Some of the modified EPDMs appeared to be branched because each of them has a higher $M_w$, a lower g', a higher Mooney viscosity, and a higher Mooney relaxation area compared to mEPDM 1, the precursor linear mEPDM. These branched EPDMs have similar ethylene contents as mEPDM 1. However, their ENB (ethylidenenorbornene) levels vary.

Table 3 also shows the properties of some modified mEPDMs (Samples 55-1#, 55-3#, and 55-4#) after a thermomechanical (compression molding of the BRABENDER™ mix at 150° C. for 25 min) treatment and the two znEPDMs (znEPDM 1 and znEPDM2). It is thought that these modified EPDMs may undergo some slight structural changes upon further thermomechanical treatment because they contain unsaturation and possibly a minor amount of residual peroxide, etc. Indeed, even mEPDM 1, after being mixed in the BRABENDER™ mixer with itself for either 10 or 20 min, showed some changes in properties (Samples C-2 and C-3). It is known that oxygen in the ambient air could slightly modify EPDM at a high temperature. However, the branching indices, g', of the modified mEPDMs are quite similar before or after the thermomechanical treatment if Sample 55-1 is compared to Sample 55-1#; Sample 55-2 is compared to Sample 55-2#; Sample 55-3 is compared to Sample 55-3#, Sample 55-4 is compared to Sample 55-4# and in Table 3.

Both znEPDM 1 and znEPDM 2 contain long chain branching because they have low g'(vis) values. Samples 55-3 and 55-4, before and after thermomechanical treatment, have lower values of g'(vis) when compared to znEPDM 1 and znEPDM 2. This suggests that the modified mEPDM has higher amounts of long chain branching than the znEPDM.

Figure 1:
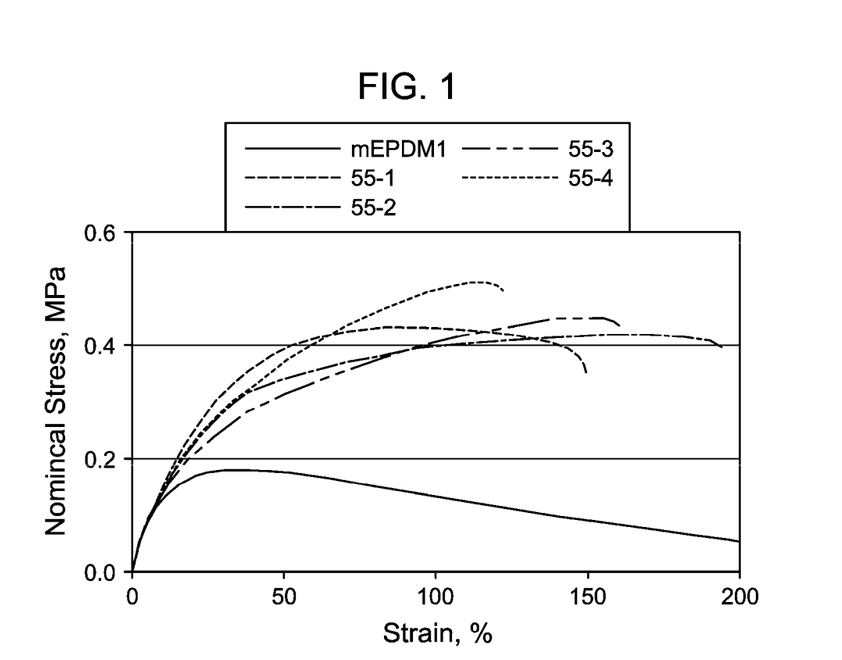
FIG. 1 shows stress-strain curves of mEPDM 1 and modified mEPDM 1 rubbers.

FIG. 1 shows the stress-strain curves of mEPDM 1 compared to the same polymer modified by DCP or DCP/DVTU for mixing times of 10 and 20 min. A maximum stress was observed in each stress-strain curve of these amorphous polymers due to the competing effects between the extension and relaxation of the polymeric chains. Table 4 summarizes the tensile properties, where the tensile strength, $\sigma_b$, of EPDM is considered as its green strength.

TABLE 4

Tensile and Rheological Properties of EPDM Materials

| Sample ID | Mixing Time (min) | $E_o$ (MPa) | $e_m$ (%) | $\sigma_m$ (MPa) | $E_{100}$ (MPa) | $e_b$ (%) | $\sigma_b$, (MPa) | U, (MJ/m³) | $\delta^{(1)}$ | Degree of Shear Thinning |
|---|---|---|---|---|---|---|---|---|---|---|
| C-1  | —  | 1.90 | 30  | 0.19 | 0.13 | 200 | 0.06 | 0.25 | 58° | 0.95 |
| 78-1 | 10 | 1.91 | 44  | 0.20 | 0.16 | 200 | 0.10 | 0.28 | 51° | 0.96 |
| 78-2 | 20 | 2.26 | 24  | 0.16 | 0.12 | 230 | 0.08 | 0.26 | 47° | 0.97 |
| 82-1 | 10 | 1.95 | 41  | 0.25 | 0.22 | 190 | 0.17 | 0.39 | 41° | 0.98 |
| 82-2 | 20 | 1.51 | 41  | 0.19 | 0.16 | 250 | 0.11 | 0.36 | 43° | 0.98 |
| 55-1 | 10 | 1.81 | 70  | 0.43 | 0.43 | 150 | 0.36 | 0.54 | 31° | 0.99 |
| 55-3 | 20 | 1.55 | 140 | 0.45 | 0.41 | 160 | 0.42 | 0.54 | 32° | 0.99 |
| 55-2 | 10 | 1.96 | 130 | 0.42 | 0.40 | 190 | 0.39 | 0.69 | 29° | 0.99 |
| 55-4 | 20 | 1.56 | 110 | 0.52 | 0.50 | 120 | 0.50 | 0.44 | 27° | 0.99 |
| C-4  | —  | 3.91 | 62  | 0.55 | 0.54 | 300 | 0.44 | 1.5  | 35° | 0.99 |
| C-5  | —  | 4.11 | 64  | 0.59 | 0.57 | 130 | 0.42 | 0.69 | 37° | 0.99 |

(1)Phase angle at a complex modulus of 10 kPa

Table 4 also shows the tensile properties of znEPDM 1 and znEPDM 2. All modified EPDMs have green strengths higher than the linear precursor mEPDM 1. Some of the inventive modified mEPDM rubbers have green strengths comparable to or higher than znEPDM 1 and znEPDM 2.

Figure 2:
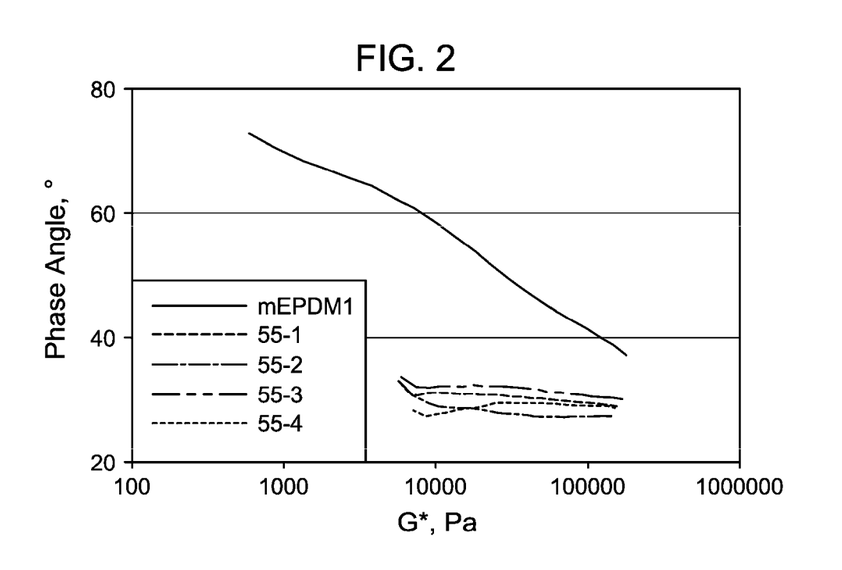
FIG. 2 is a van Gurp-Palmen plot of mEPDM 1 and modified mEPDM 1 rubbers, where G* denotes the complex modulus.

FIG. 2 compares the van Gurp-Palmen plot of mEPDM 1 to those of the same polymer modified by DCP or DCP/DVTU at mixing times of 10 and 20 min. At a given value of G*, the various modified EPDMs have a lower phase angle than mEPDM 1. Therefore, the melt elasticity or the melt strength of mEPDM 1 is enhanced after the appropriate chemical modification of DCP or DCP/DVTU.

In Table 4, the phase angle at a G* of 10 kPa for ranking these polymeric materials is shown. All modified mEPDMs have a phase angle lower than the linear precursor mEPDM 1 rubber, hence higher melt elasticity or strength. Also, all modified EPDMs exhibit higher degrees of shear thinning than mEPDM 1. Some modified mEPDMs have degrees of shear thinning similar to those of znEPDM 1 and znEPDM 2.

Example 2 mEPDM 2 and 0.12 wt % of DCP (0.25 g of DCP mixed with 220 g of V6602) were accurately weighed according to the formulation described in Table 5. A BRABENDER™ mixer (250-g capacity) was heated to 150° C. mEPDM 2 was introduced into the preheated BRABENDER™ mixer and mixing was started. A rotor speed of 50 rpm was used throughout the run and the system was kept at temperature desired and stable. After mEPDM 2 was mixed with itself for 2 min, DCP was charged into the mixer. Mixing was continued for either 10 or 20 min once all the blend components were incorporated into mEPDM 2. Finally the blend was discharged from the mixer, cut into small pieces, and allowed to cool down. These small pieces of rubber were then placed in a vacuum oven at about 100° C. to 110° C. for about 12 hr to remove any residual decomposition products.

TABLE 5

Properties of Various EPDM Materials

| Sample ID | DCP (wt %) | Mixing Time (min) | $M_w$* kg/mol | $M_w/M_n$** | g' | $C_2$ (wt %) | ENB (wt %) | ML (1 + 4) 125° C. | MLRA | MLRA/ (ML (1 + 4)) (s) |
|---|---|---|---|---|---|---|---|---|---|---|
| C-1    | —    | —  | 174 | 3.69 | 1.002 | 50.4 | 4.0 | 29 | 94  | 3.24 |
| mEPDM 2 | —    | —  | 283 | 2.70 | 0.999 | 55.7 | 5.4 | 81 | 323 | 3.99 |
| 78-3   | 0.12 | 10 | 323 | 3.61 | 0.766 | 55.4 | 4.2 | 69 | 837 | 12.1 |
| 78-4   | 0.12 | 20 | 178 | 3.13 | 0.777 | 55.7 | 3.3 | 65 | 911 | 14.0 |

*Mw was determined from GPC.
**Mw/Mn values were determined from GPC.

Properties of the modified mEPDM 2 materials are shown in Table 5, above. They contain branching because each of them has a higher $M_w$, a lower g', and a higher Mooney relaxation compared to the precursor mEPDM 2. A lower Mooney viscosity was also observed.

Table 6 summarizes the tensile properties.

TABLE 6

Tensile and Rheological Properties of EPDM Materials

| Sample ID | DCP (wt %) | Mixing Time, min | $E_o$, MPa | $e_m$, % | $\sigma_m$, MPa | $E_{100}$, MPa | $e_b$, % | $\sigma_b$, MPa | U, MJ/m³ | $\delta^{(1)}$ | Degree of Shear Thinning |
|---|---|---|---|---|---|---|---|---|---|---|---|
| C-1 | — | — | 1.90 | 30 | 0.19 | 0.13 | 200 | 0.06 | 0.25 | 58° | 0.95 |
| mEPDM 2 | — | — | 3.65 | 36 | 0.49 | 0.39 | 110 | 0.37 | 0.45 | 45° | 0.98 |
| 78-3 | 0.12 | 10 | 2.59 | 83 | 0.49 | 0.49 | 120 | 0.46 | 0.51 | 26° | 0.99 |
| 78-4 | 0.12 | 20 | 1.95 | 66 | 0.57 | — | 79 | 0.50 | 0.31 | 22° | 0.99 |
| C-4 | — | — | 3.91 | 62 | 0.55 | 0.54 | 300 | 0.44 | 1.5 | 35° | 0.99 |
| C-5 | — | — | 4.11 | 64 | 0.59 | 0.57 | 130 | 0.42 | 0.69 | 37° | 0.99 |

$^{(1)}$Phase angle at a complex modulus G* of 10 kPa.

Tensile strength, $\sigma_b$, of EPDM is considered as its green strength. The various modified mEPDM 2 rubbers have green strengths higher than the linear precursor mEPDM 2 rubber. Table 5 also shows the tensile properties of znEPDM 1 and znEPDM 2 rubbers. Therefore, both of the inventive modified mEPDM 2 rubbers advantageously have green strengths higher than both znEPDM 1 and znEPDM 2 rubbers.

In Table 6, the phase angle δ at a G* of 10 kPa for ranking these polymeric materials is shown. Compared to mEPDM 2 rubber, the modified mEPDM 2 rubbers have smaller phase angles. Therefore, the melt elasticity or the melt strength of mEPDM 2 is enhanced after the appropriate chemical modification of 0.12 wt % DCP. These modified mEPDM 2 rubbers also exhibit higher degrees of shear thinning, which are similar to those of znEPDM 1 and znEPDM 2 rubbers.

Figure 3:
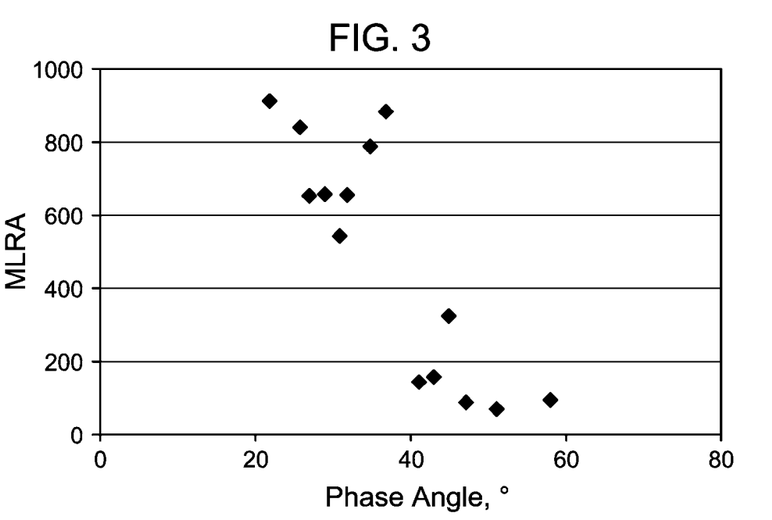
FIG. 3 shows the MLRA versus phase angle of EPDMs and modified EPDMs.

FIG. 3 shows the plot of MLRA versus phase angle for the various EPDMs and modified EPDMs in Tables 4 and 6.

Figure 4:
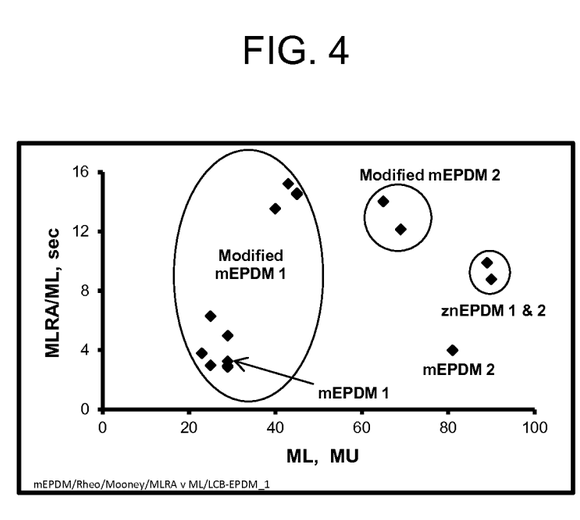
FIG. 4 shows the MLRA/ML versus ML of EPDMs and modified EPDMs, where ML is (ML(1+4) measured at 125° C.

FIG. 4 shows the plot of MLRA/ML (1+4) versus ML (1+4) for the various EPDMs and modified EPDMs in the previous tables. Some modified EPDMs have higher MLRA/ML (1+4) value or longer "relaxation times" than the znEPDM 1 and znEPDM 2 rubbers.

Example 3

Blends

A BRABENDER™ mixer (50-g capacity) was heated to 150° C. The mixture of mEPDM 1 and one of the modified EPDMs described in Tables 2 and 4 was introduced in the preheated BRABENDER™ mixer together with 0.15 wt % of IRGANOX 1076. A rotor speed of 50 rpm was used throughout the run and the system was kept at temperature desired and stable. Mixing was continued for 20 min once all the blend components were incorporated in the mEPDM. Finally the blend was discharged from the mixer and allowed to cool down.

Table 7 shows the blend properties compared to the neat mEPDM 1. The phase angle, δ, at a G* of 10 kPa for ranking these polymeric materials is shown. At 10 wt % modifier, the blends do not show lower phase angles and higher degrees of shear thinning than mEPDM 1. Therefore, the melt elasticity or melt strength and the degree of shear thinning of mEPDM 1 are not improved with the addition of 10 wt % modifier.

By increasing the modifier concentration to 30 wt %, the blends begin to show lower phase angles and equal amounts of shear thinning compared to mEPDM 1. Therefore, the melt elasticity or melt strength of mEPDM 1 rubber is improved with the addition of 30 wt % modifier. Also, all the blends containing either 10 wt % or 30 wt % modifier exhibit lower complex melt viscosities at all frequencies (or shear rates) than mEPDM 1 rubber, as shown in Table 8. This improves the melt processability (ease of flow) of mEPDM 1 rubber with the incorporation of the modified mEPDMs. The modified mEPDMs should also increase the green strength of mEPDM 1 rubber.

TABLE 7

Rheological and Tensile Properties of EPDM and EPDM Blends

| Sample # | EPDM BLEND | $\delta^{(1)}$ | Degree of Shear Thinning | $E_o$, MPa | $E_{100}$, MPa | $e_m$, % | $\sigma_m$, MPa | $e_b$, % | $\sigma_b$, MPa | U, MJ/m³ |
|---|---|---|---|---|---|---|---|---|---|---|
| C-1 | mEPDM 1 | 58° | 0.95 | 1.90 | 0.13 | 30 | 0.19 | 200 | 0.06 | 0.25 |
| 95-4 | mEPDM 1 + 10 wt % 82-2 | 59° | 0.95 | 1.29 | 0.11 | 24 | 0.14 | 210 | 0.04 | 0.20 |
| 95-1 | mEPDM 1 + 10 wt % 55-3 | 60° | 0.94 | 1.99 | 0.16 | 37 | 0.20 | 220 | 0.07 | 0.29 |
| 95-2 | mEPDM 1 + 10 wt % 55-4 | 59° | 0.95 | 1.80 | 0.17 | 24 | 0.21 | 210 | 0.08 | 0.31 |
| 95-3 | mEPDM 1 + 10 wt % 78-4 | 58° | 0.95 | 1.75 | 0.16 | 32 | 0.18 | 220 | 0.07 | 0.29 |
| 98-4 | mEPDM 1 + 30 wt % 82-2 | 57° | 0.95 | 0.86 | 0.10 | 31 | 0.14 | 190 | 0.03 | 0.18 |
| 98-1 | mEPDM 1 + 30 wt % 55-3 | 56° | 0.95 | 1.20 | 0.14 | 36 | 0.15 | 240 | 0.08 | 0.27 |
| 98-2 | mEPDM 1 + 30 wt % 55-4 | 56° | 0.95 | 1.04 | 0.12 | 35 | 0.14 | 220 | 0.07 | 0.23 |
| 98-3 | mEPDM 1 + 30 wt % 78-4 | 56° | 0.95 | 1.26 | 0.16 | 37 | 0.16 | 220 | 0.10 | 0.29 |

$^{(1)}$Phase angle at a complex modulus of 10 kPa

TABLE 8

Complex Melt Viscosity of EPDM and EPDM Blends at 190° C.

| Frequency, rad/s | C-1 $\eta^*$, Pa·s | 95-4 $\eta^*$, Pa·s | 95-1 $\eta^*$, Pa·s | 95-2 $\eta^*$, Pa·s | 95-3 $\eta^*$, Pa·s | 98-4 $\eta^*$, Pa·s | 98-1 $\eta^*$, Pa·s | 98-2 $\eta^*$, Pa·s | 98-3 $\eta^*$, Pa·s |
|---|---|---|---|---|---|---|---|---|---|
| 0.010 | 60399 | 44259 | 32013 | 39100 | 45650 | 45634 | 45167 | 43420 | 45645 |
| 0.016 | 56356 | 42099 | 31382 | 39136 | 43034 | 42845 | 43392 | 39268 | 41010 |
| 0.025 | 53353 | 38831 | 29051 | 35253 | 39598 | 39242 | 39338 | 35917 | 37091 |
| 0.040 | 48171 | 35940 | 27119 | 32373 | 36244 | 35612 | 35128 | 32326 | 33580 |
| 0.063 | 43212 | 32479 | 24871 | 29196 | 32808 | 31877 | 30950 | 29083 | 29931 |
| 0.1 | 38260 | 29152 | 22548 | 26299 | 29298 | 28259 | 27096 | 25769 | 26449 |
| 0.16 | 33577 | 25989 | 20300 | 23452 | 26117 | 24866 | 23522 | 22646 | 23177 |
| 0.25 | 29228 | 22888 | 18062 | 20717 | 22995 | 21604 | 20280 | 19712 | 20165 |
| 0.40 | 25132 | 19913 | 15941 | 18095 | 19996 | 18584 | 17296 | 17017 | 17360 |
| 0.63 | 21310 | 17101 | 13832 | 15585 | 17150 | 15776 | 14629 | 14504 | 14762 |
| 1.0 | 17812 | 14447 | 11891 | 13195 | 14498 | 13208 | 12218 | 12247 | 12416 |
| 1.6 | 14712 | 12058 | 10098 | 11051 | 12062 | 10928 | 10089 | 10202 | 10355 |
| 2.5 | 11997 | 9912 | 8425 | 9120 | 9944 | 8929 | 8260 | 8396 | 8489 |
| 4.0 | 9655 | 8041 | 6939 | 7438 | 8076 | 7209 | 6676 | 6828 | 6879 |
| 6.3 | 7699 | 6468 | 5652 | 5978 | 6479 | 5759 | 5341 | 5493 | 5522 |
| 10 | 6091 | 5137 | 4525 | 4768 | 5155 | 4563 | 4235 | 4377 | 4377 |
| 16 | 4793 | 4057 | 3629 | 3770 | 4068 | 3591 | 3339 | 3463 | 3447 |
| 25 | 3750 | 3189 | 2881 | 2964 | 3186 | 2816 | 2614 | 2724 | 2701 |
| 40 | 2923 | 2499 | 2266 | 2312 | 2485 | 2193 | 2037 | 2129 | 2100 |
| 63 | 2265 | 1946 | 1777 | 1799 | 1932 | 1703 | 1579 | 1654 | 1625 |
| 100 | 1746 | 1505 | 1384 | 1390 | 1490 | 1314 | 1220 | 1278 | 1249 |

The blend systems disclosed herein can be categorized into at least two classes: linear-(EPDM)$_a$ blended with LCB-(EPDM)$_a$ and linear-(EPDM)$_a$ blended with LCB-(EPDM)$_b$, where (EPDM)$_a$ and (EPDM)$_b$ have different M$_w$ values, C$_2$ contents, ENB contents, etc., and LCB means long chain branching. The inventors suggest that with careful choice of the compositions of the blend component and the compounding of the selected blend with carbon black, oil and curatives, the cured blend system can exhibit some unusual properties, and possibly improved properties.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, "comprising" encompasses the terms "consisting essentially of," "is," and "consisting of" and anyplace "comprising" is used "consisting essentially of," "is," or "consisting of" may be substituted therefor.

The invention claimed is:

1. A process for producing a highly branched composition comprising:
   (i) contacting:
      (a) from about 96 wt % to about 99.9 wt % of at least one metallocene catalyzed ethylene propylene diene rubber, based on the total weight of the rubber and multifunctional monomers;
      (b) from about 0.1 to about 4 wt % of at least one multifunctional monomer, based on the total weight of the rubber and multifunctional monomers;
      (c) at least one free radical generator; and
   (ii) obtaining a highly branched composition.

2. The process of claim 1, wherein the highly branched composition has one or more of the following properties:
   (a) a Mooney viscosity ML (1+4) at 125° C. of about 30 to 100 MU;
   (b) a Mooney relaxation area MLRA of about 100 to about 1000;
   (c) a branching index, g'(vis) of less than about 0.9;
   (d) a phase angle, δ, of less than about 55 degrees at a complex modulus of 10 kPa, measured at 190° C.; and
   (e) a degree of shear thinning greater than about 0.95, measured at 190° C.

3. The process of claim 1, wherein from about 0.1 wt % to about 3.5 wt % of the free radical generator is used in the contacting step, based on the total weight of the rubber and multifunctional monomers.

4. The process of claim 1, wherein the multifunctional monomer comprises one or more of vinyl compounds, allylic compounds, acrylate compounds, and combinations thereof.

5. The process of claim 1, wherein the multifunctional monomer is selected from the group consisting of 3,9-divinyl-2,4,8,10-tetraoxaspiro[5,5]undecane, 2,5-norbornadiene, divinylphenylphosphine, divinyl sulfone, divinyl sulfoxide, 1-3-divinyltetramethyldisiloxane, 1,2 polybutadiene, divinyl benzene, and combinations thereof.

6. The process of claim 1, wherein the multifunctional monomer is selected from the group consisting of triallyl trimesate, triallyl trimellitate, diallyl terephthalate, diallyl isophthalate, diallyl phthalate, triallylcyanurate, triallylisocyanurate, triallylamine, triallyl 1,3,5-benzenetricarboxylate, triallylphosphine, triallyl phosphate, 1,3,5-triallyl-1,3,5-triazine-2,4,6(1H,3H,5H)-trione, and combinations thereof.

7. The process of claim 1, wherein the multifunctional monomer is selected from the group consisting of trimethylolpropane trimethacrylate, trimethylolpropane triacrylate, polyethylene glycol dimethacrylate, ethylene glycol dimethacrylate, triethylene glycol diacrylate, pentaerythritol triacrylate, pentaerythrithyl tetramethacrylate 1,4-butanediol diacrylate, 1,6-hexanediol diacrylate, and combinations thereof.

8. The process of claim 1, wherein from about 98 wt % to about 99.9 wt % ethylene propylene diene rubber is used in the contacting step, based on the total weight of the rubber and multifunctional monomers.

9. The process of claim 1, wherein from about 0.5 wt % to about 2 wt % multifunctional monomer is used in the contacting step, based on the total weight of the rubber and multifunctional monomers.

10. The process of claim 1, wherein the free radical generator comprises one or more of benzoyl peroxide, methyl ethyl ketone peroxide, tert-butyl peroxy benzoate, tert-butyl perbenzoate, tert-butylperoxy acetate, tert-butyl (2-ethylhexyl) monoperoxy carbonate, n-butyl-4,4-di-(tert-butyl peroxy) valerate, 1,1-bis(tert-butylperoxy)cyclohexane, 1,1-bis(tert-butylperoxy)-3,3,5-trimethylcyclohexane, 2,2-bis(tert-butylperoxy)butane, tert-butylcumylperoxide, bis-(tert-butylperoxy isopropyl)benzene, di-tert-butylperoxide, 2,5-dimethyl-2,5-di(tert-butylperoxy)hexane, cyclohexanone peroxide, t-butylperoxyisopropyl carbonate, di-ti-butyl terphthalate, 2,5-dimethyl-2,5-di(t-butylperoxy)hexene, 2,5-dimethyl-2,5-di(t-butylperoxy) hexyne-3, di-(tert-amyl) peroxide, bis(alpha-methylbenzyl) peroxide, benzoyl peroxide, 3,6,9-triethyl-3,6,9-trimethyl-1,4,7-triperoxonane, bis(tert-butylperoxy)-diisopropylbenzene, di-tert-butyl peroxide, cumene hydroperoxide, tert-butyl hydroperoxide, hydroperoxides, dilauryl peroxide, dicumyl peroxide, derivatives thereof, or combinations thereof.

11. The process of claim 1, wherein the metallocene catalyzed ethylene propylene diene rubber comprises at least 35 wt % ethylene, based on the total weight of the metallocene catalyzed ethylene propylene diene rubber.

12. The process of claim 1, wherein the metallocene catalyzed ethylene propylene diene rubber comprises at least 2 wt % ethylidenenorbornene, based on the total weight of the metallocene catalyzed ethylene propylene diene rubber.

13. The process of claim 1, further comprising drying the highly branched composition to remove residual free radical generator.

* * * * *